United States Patent
Onodera et al.

[11] Patent Number: 5,886,910
[45] Date of Patent: Mar. 23, 1999

[54] COMPUTER WITH A CHECK FUNCTION

[75] Inventors: Susumu Onodera, Ome; Yasuo Ikeya, Mizuhomachi; Katsuyoshi Suzuki, Hamura, all of Japan

[73] Assignee: Casio Computer Co., Ltd., Tokyo, Japan

[21] Appl. No.: 600,398

[22] Filed: Feb. 12, 1996

[30] Foreign Application Priority Data

Feb. 24, 1995 [JP] Japan ..................................... 7-062178
Jun. 30, 1995 [JP] Japan ..................................... 7-165540

[51] Int. Cl.$^6$ ....................................................... G06F 3/00
[52] U.S. Cl. .................................. 364/709.06; 364/709.12
[58] Field of Search ........................ 364/709.06, 709.12, 364/710.05, 736.5

[56] References Cited

U.S. PATENT DOCUMENTS

| | | | |
|---|---|---|---|
| 4,291,385 | 9/1981 | Osborne et al. ......................... | 364/709 |
| 4,580,235 | 4/1986 | Yanagawa ................................ | 364/710 |
| 5,161,118 | 11/1992 | Matsuda et al. ......................... | 364/744 |
| 5,335,193 | 8/1994 | Kawawaki .......................... | 364/709.12 |
| 5,515,304 | 5/1996 | Ishii et al. ........................... | 364/709.12 |
| 5,542,079 | 7/1996 | Hatakeyama .............................. | 395/800 |

FOREIGN PATENT DOCUMENTS

3725284 A1   2/1989   Germany .

Primary Examiner—Paul P. Gordon
Assistant Examiner—Marc McDieunel
Attorney, Agent, or Firm—Frishauf, Holtz, Goodman, Langer & Chick

[57] ABSTRACT

A device having a checking function includes a detector for detecting unrelated data included in first inputted calculation data which is not related to a predetermined calculation to be performed on the first inputted calculation data. A memory controller is provided for controlling a memory so as not to store the unrelated data included in the first inputted calculation data when the detector detects the unrelated data. A check mode may be set whereby second inputted calculation data is compared with the stored first inputted calculation data and whereby it is then determined whether the second inputted calculation data is coincident with the stored first inputted calculation data. In addition, an indicator is provided for alerting a user when it is determined that the second inputted calculation data is not coincident with the stored first inputted calculation data.

6 Claims, 21 Drawing Sheets

| INPUT WRONG NUMERALS AND CORRECTION ||
|---|---|
| ILLUSTRATIVE OPERATION | RECORD |
| (A)<br>100 [−] 300 [−] 200 [=] | 100 [−]<br>300 [−]<br>200 [=] |
| (B)<br>100 [−] 300 [−] 202 [▽] 0 [=] | |
| (C)<br>10 [−] 30 [+] 20 [=] | 10 [−]<br>30 [+]<br>20 [=] |
| (D)<br>10 [−] 30 [+] 50 [C] 20 [=] | |

FIG.12

| REPETITION OF SIGN CHANGE ||
|---|---|
| ILLUSTRATIVE OPERATION | RECORD |
| (A)<br>123 [+] [+/−] [=] | 123 [+]<br>[+/−]<br>[=] |
| (B)<br>123 [+] [+/−] [+/−] [+/−] [=] | |
| (C)<br>123 [+] [+/−] [+/−] [+/−] [+/−] [+/−] [=] | |
| (D)<br>123 [+] [=] | 123 [+]<br>[=] |
| (E)<br>123 [+] [+/−] [+/−] [=] | |
| (F)<br>123 [+] [+/−] [+/−] [+/−] [+/−] [=] | |

FIG.13

| ERROR REMOVAL OPERATION ||
|---|---|
| ILLUSTRATIVE OPERATION | RECORD |
| (A)<br><br>999···9 [+] 2 [=] [C] [+] 1 [=]<br>(FULL PLACES) | 999···9 [+]<br>2 [=]<br>[+]<br>1 [=] |
| (B)<br><br>100 [÷] 0 [=] [C] [+] 10 [=] | 100 [+]<br>0 [=]<br>[+]<br>[=] |
| (C)<br><br>2 [+/−] [√] [C] [+] 5 [=] | -2 [√]<br>[+]<br>5 [=] |

FIG.14

| CORRECTION TO FUNCTION ||
|---|---|
| ILLUSTRATIVE OPERATION | RECORD |
| (A)<br><br>123 [+] [−] 100 [=] | 123 [−]<br>100 [=] |
| (B)<br><br>123 [+] [−] [×] 100 [=] | 123 [×]<br>100 [=] |

FIG.15

| REPETITION OF LOCKING AND UNLOCKING INPUT DATA ||
|---|---|
| ILLUSTRATIVE OPERATION | RECORD |
| (A)<br>123 [+] [+] 10 [=] | 123 [+]<br>[+]<br>10 [=] |
| (B)<br>123 [+] [+] [+] [+] 10 [=] | |
| (C)<br>123 [+] 10 [=] | 123 [+]<br>10 [=] |
| (D)<br>123 [+] [+] [+] 10 [=] | |

FIG.16

| KEY OPERATION INVALIDATED BY NEXT KEYED-IN DATA ||
|---|---|
| ILLUSTRATIVE OPERATION | RECORD |
| (A)<br>560 [×] 12 [MR] [=] | 560 [×]<br>[MR]<br>[=] |
| (B)<br>560 [×] [+/−] [MR] [=] | |
| (C)<br>560 [×] [MR] [=] | |
| (D)<br>560 [×] [+/−] 786 [=] | 560 [×]<br>786 [=] |
| (E)<br>560 [×] 786 [=] | |

FIG.17

| OTHER OPERATIONS ||
|---|---|
| ILLUSTRATIVE OPERATION | RECORD |
| (A)<br>560 [×] [MR] [MR] [MR] [=] | 560 [×]<br>[MR]<br>[=] |
| (B)<br>560 [×] [MR] [MR] [=] | ^ |
| (C)<br>560 [×] [MR] [=] | ^ |
| (D)<br>2 [+/−] [√] [+] [×] [ C ] [÷] 3 [=] | -2 [√]<br>[÷]<br>3 [=] |
| (E)<br>2 [+/−] [√] [ C ] [÷] 3 [=] | ^ |

FIG.18

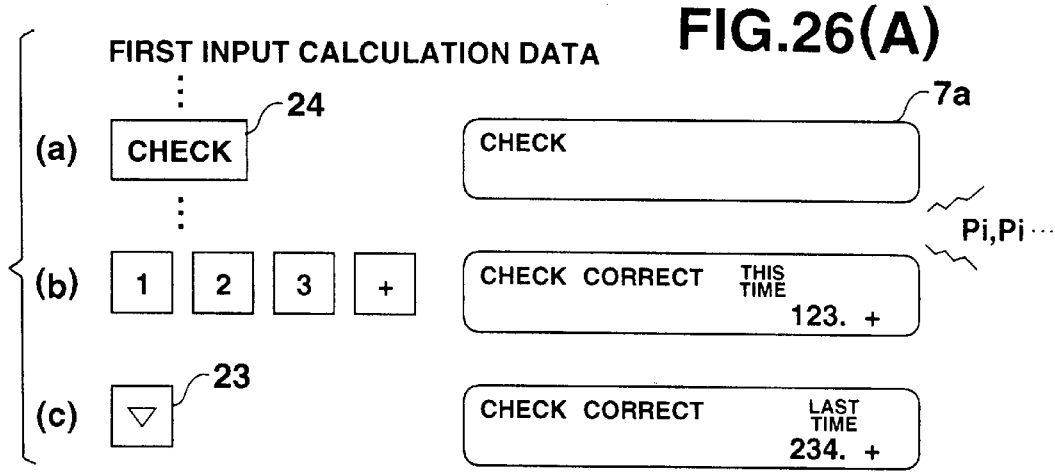
FIG.26(A)
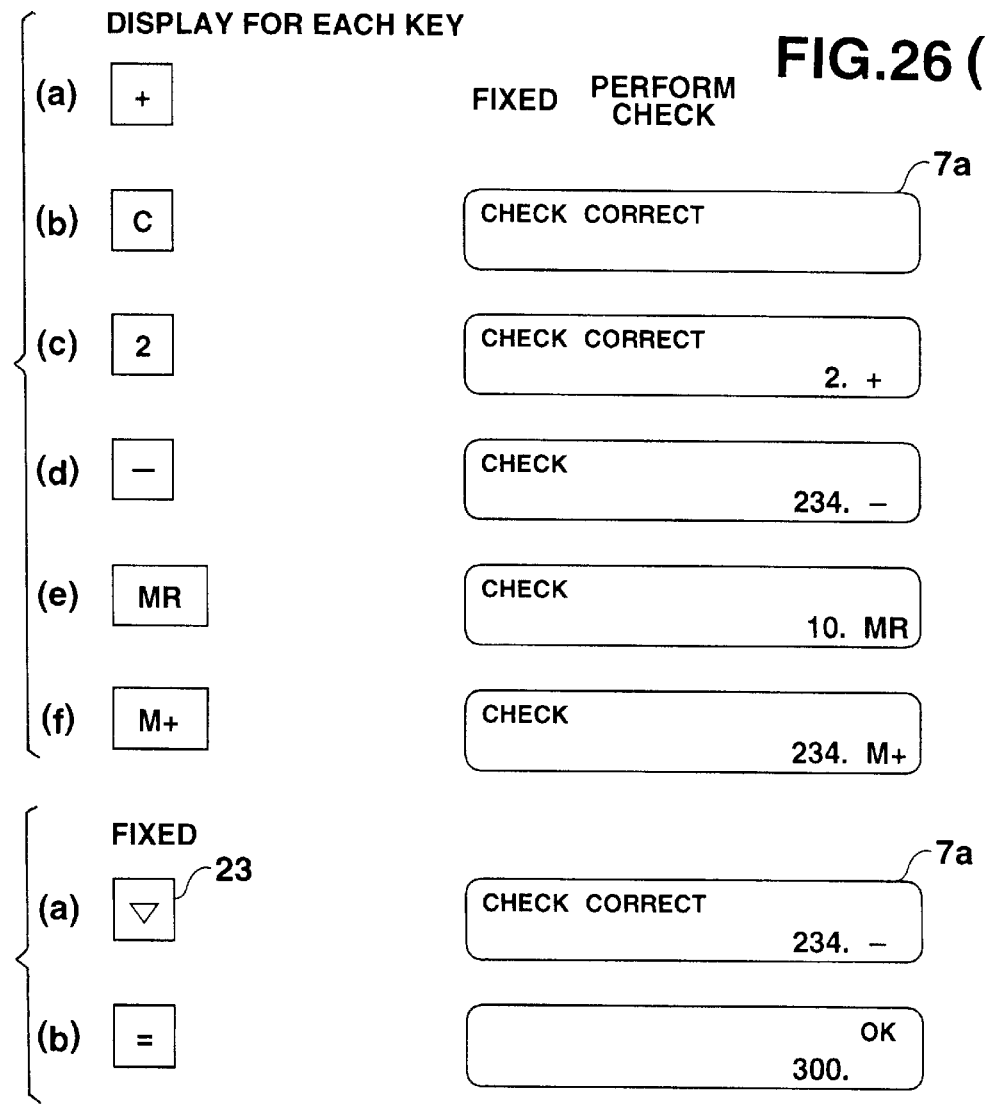
FIG.26(B)
FIG.26(C)

COMPUTER WITH A CHECK FUNCTION

BACKGROUND OF THE INVENTION

1. Field of the Invention

The present invention relates to computers, and more particularly to a computer which has the functions of performing a calculating operation on an input series of calculation expression data, storing same and comparing the stored data with a series of calculation expression data input next to thereby perform a check operation.

2. Description of the Prior Art

Conventionally, a check operation is carried out to confirm the correctness of the result of any calculation. This check operation is performed as follows: after any calculation, the same calculation is again made and the result of the former calculation is compared with the result of the latter calculation.

A computer has been considered which has the function of checking the result of a calculation under control thereof. This computer sequentially stores a series of calculation expression data input first, and makes a calculation on the data to obtain the result of the calculation. Execution of the check operation is then designated. A second series of calculation expression data which is believed to be the same as the first input series of calculation expression data is newly input and compared sequentially with the stored first series of calculation expression data. As a result, if the first series of calculation expression data is not coincident with the second series of calculation data, this fact is reported.

However, the computer of this type stores the first input series of calculation expression data as is, inclusive of data unrelated to the actual calculation. Thus, when the check operation is performed, exactly the same input operation as that first performed is required to be performed even on any first input data unrelated to the calculation.

SUMMARY OF THE INVENTION

It is therefore an object of the present invention to provide a computer which is capable of performing a check operation on a first input series of calculation data with a minimum necessary quantity of calculation expression data irrespective of errors in the inputting operation of the first series of calculation data which occur when data unrelated to the actual calculation is inputted during the inputting operation of the first series of calculation data.

In order to achieve the above object, the present invention provides a device having a checking function, said device comprising:

detecting means for detecting unrelated data included in first inputted calculation data which is not related to a predetermined calculation to be performed on the first inputted calculation data;

memory control means, responsive to said detecting means detecting the unrelated data included in the first inputted calculation data, for controlling a memory so as not to store the unrelated data;

check mode setting means for setting a check mode whereby second inputted calculation data is compared with the stored first data inputted calculation data;

checking means for determining whether the second inputted calculation data is coincident with the stored first inputted calculation data; and an indicator for alerting a user when the checking means determines that the second inputted calculation data is not coincident with the stored first inputted calculation data.

By such arrangement, an accurate reliable check operation is achieved and the operability of the computer is enhanced.

BRIEF DESCRIPTION OF THE DRAWINGS

FIG. 12 illustrates key-in operations and corresponding data records in a journal memory in a regular operation mode;

FIG. 13 illustrates key-in operations in the regular operation mode and corresponding data records in the journal memory;

FIG. 14 illustrates key-in operations and corresponding data records in the journal memory in the regular operation mode in the regular operation mode;

FIG. 15 illustrates key-in operations in the regular operation mode and corresponding data records in the journal memory;

FIG. 16 illustrates key-in operations in the regular operation mode and corresponding data records in the journal memory;

FIG. 17 illustrates key-in operations in the regular operation mode and corresponding data records in the journal memory;

FIG. 18 illustrates key-in operations in the regular operation mode and corresponding data records in the journal memory;

FIG. 26 shows display operations corresponding to key operations in the check mode operation of the computer in the second embodiment. FIG. 26A shows a display state present until non-coincident calculation data is confirmed in the check operation; FIG. 26B shows corrected display states for the respective keys; and FIG. 26C shows display states present after the check operation has been fixed.

DESCRIPTION OF THE PREFERRED EMBODIMENTS

Embodiments of the present invention will be described with reference to the drawings.

Figure 1:
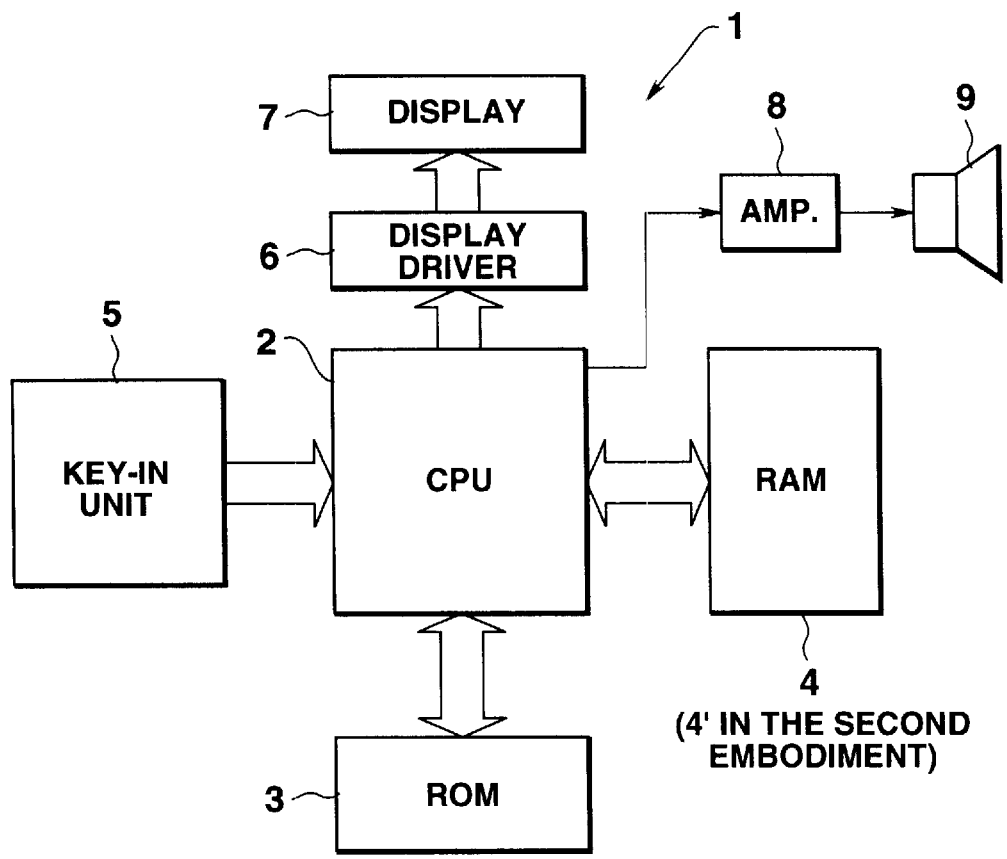
FIG. 1 is a block diagram indicative of the basic circuit structure of a computer as a first embodiment of the present invention.

First Embodiment:

FIG. 1 is block diagram indicative of the basic structure of the computer of this embodiment.

The computer 1 of FIG. 1 includes a central processing unit (CPU) 2 which controls the whole computer 1 in accordance with program commands, a read only memory (ROM) 3 which contains microprograms processed by the CPU 2, a random access memory (RAM) 4 which stores data, a key-in unit 5 which is used to key in data and to select a mode to be described later, a display driver 6 and a display 7 which display numerical data and various message data output from the CPU 2, an amplifier 8 and a speaker 9 which respectively amplify a reporting sound signal from the CPU 2 and output a corresponding sound.

Figure 2:
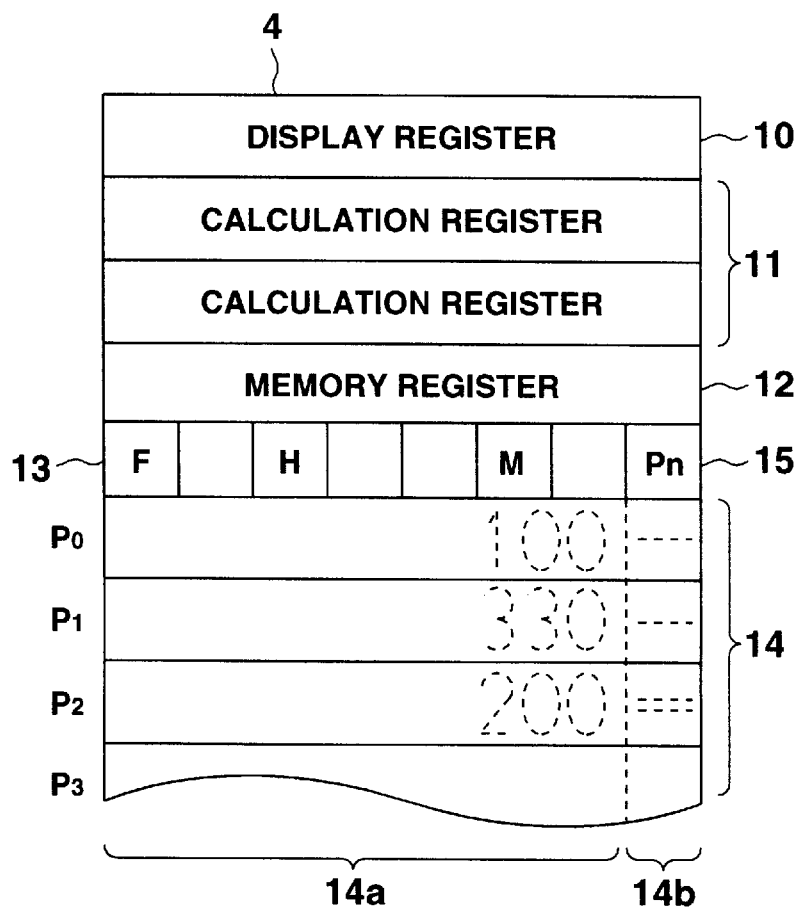
FIG. 2 illustrates the structure of a memory area of the computer.

As shown in FIG. 2, the RAM 4 includes a display register area 10 (which acts also as an input numeral register area) which stores data displayed on the display 7, a calculation register area 11 which temporarily stores numerical values processed by the CPU 2, a memory register area 12 which temporarily stores the result of the calculation, and a flag register area 13 which stores various condition flags F, H, M indicative of corresponding conditions in the execution of a program.

The contents of the respective flags are as follows:

F=0: a regular operational mode;
F=1: a check mode;
H=1: a correction mode;
H=0: release of the correction mode;
M=1: operated numeral inputting key
M=0: operated calculation command key.

RAM 4 includes a journal memory area 14 which temporarily stores the input data from the key-in unit 5, and a pointer area 15 which stores an address pointer Pn indicative of a respective one of the registers in the journal memory area 14.

The journal memory area 14 includes an input numerical value memory area 14a which stores an input numerical value, and a function memory area 14b which stores input calculation commands "+", "−", "×", "÷", "=", "√", "%" and "+/−". Sets of numerical data and subsequent keyed-in calculation command data are sequentially input from the key-in unit 5 and stored sequentially in register areas of the journal memory 14 designated by address pointers P0, P1, P2, P3, . . .

Figure 3:
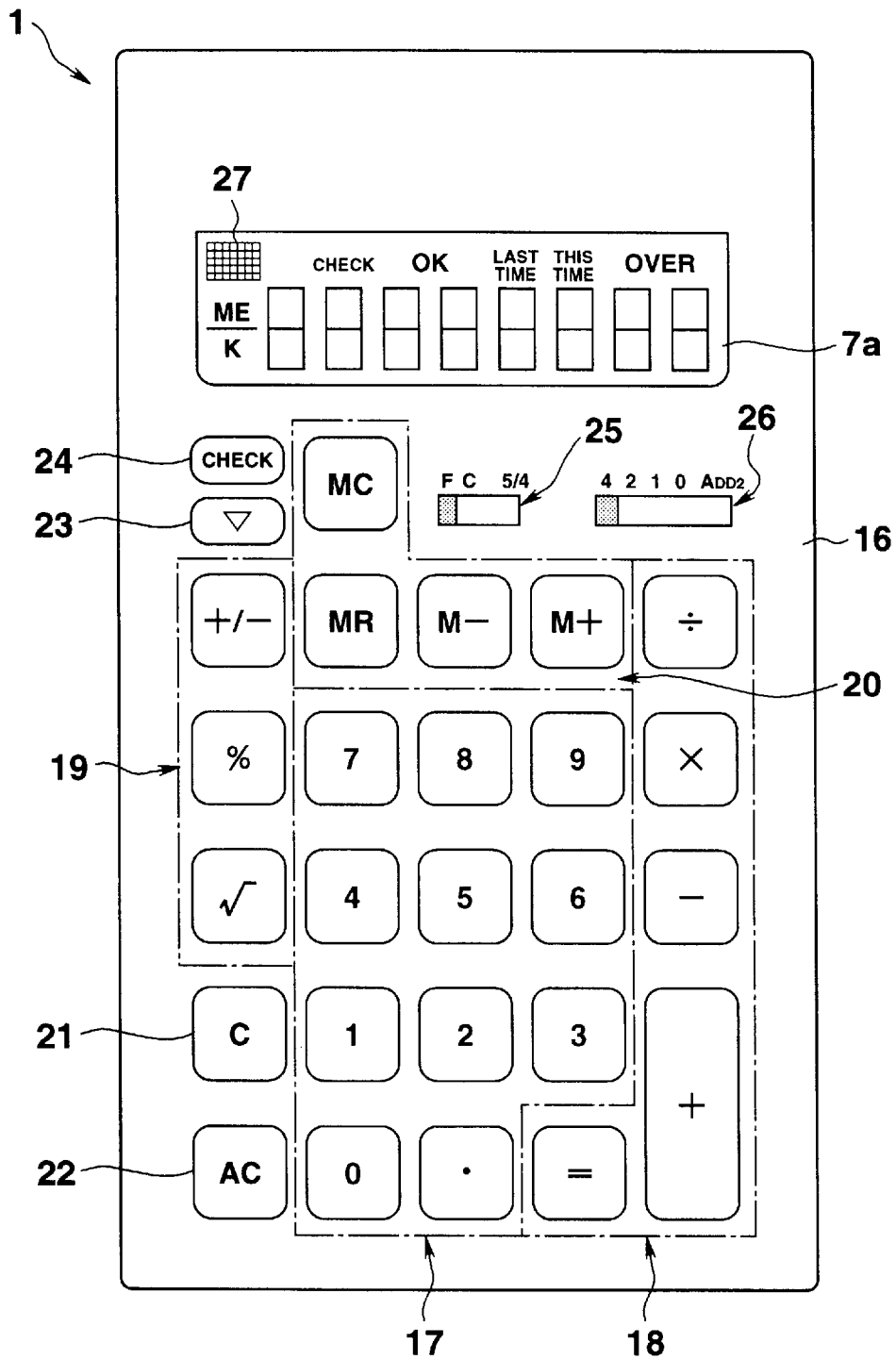
FIG. 3 shows the appearance of the computer.

As shown in FIG. 3, the key-in unit 5 includes a numeral inputting key group 17, calculation command key groups 18, 19, a memory key group 20, a clear "C" key 21, an all-clear "AC" key 22, a place down "∇" key 23, and a check key 24, provided on the control panel 16 of the computer 1.

The numeral inputting key group 17 includes numeral keys "0"–"9" used to input corresponding numerical values "0"–"9" and a decimal point "." key to input a decimal point.

The calculation command key group 18 includes arithmetic calculation command keys "+", "−", "×", "÷" which input the corresponding calculation commands and an equal "=" key which is used to obtain the answer of the required calculation.

The calculation command key group 19 includes a positive/negative "+/−" key used to change the (positive/negative) sign of a displayed numerical value, a percent "%" key used to make a percent calculation, a root calculation "√" key used to make a square root calculation.

The memory key group 20 includes a memory plus "M+" key used to add a displayed numerical value (or input the displayed numerical value with a plus sign) to the numerical value stored in the memory register, a memory minus "M−" key used to subtract a displayed numerical value from the numerical value stored in the memory register (or add the displayed numerical value with a minus sign to the numerical value stored in the memory register), a memory recall "MR" key used to call back a numerical value stored in the memory register, and a memory recall/clear "MC" key used to recall and simultaneously erase a numerical value stored in the memory register.

The "C" key 21 is used to correct a wrongly keyed-in numerical value.

The "AC" key 22 is used to erase (initialize) all data input and calculated so far.

The "∇" key 23 is used to erase the displayed least significant place of a displayed numerical value. Each time this key is depressed, the number of places of the numerical value concerned is reduced by one. This key is also used to alternately display in the check mode the results of calculations performed this time and last time.

The check key 24 is a command key used to alternately select a standard or regular calculation mode and a check mode.

Provided on the control panel 16 of the computer 1 are a round switch 25 and a decimal point designation switch 26. The round switch 25 designates how a fraction should be processed and can designate any one of a free mode "F" in which the result of the calculation is obtained to as many decimal places as desired, a cut mode "C" in which a place directly below a decimal place designated by the decimal point designation switch 26 is discarded, and a round "5/4" mode in which the result of the calculation is rounded off to designated decimal places by counting fractions of 0.5 and over as a unit and cutting away the rest.

The decimal point designating switch 26 is effective when the round switch 25 is in the cut "C" mode or the round "5/4" mode to designate any one of a "0" place mode which implies performing no calculation down to any decimal places; a "1" mode which implies performing calculation down to one decimal place; a "2" mode which implies performing calculation down to two decimal places; and a "4" mode which implies performing calculation down to four decimal places.

The decimal point designating switch 39 is also capable of designating a fixed decimal point "ADD 2" mode in which a decimal point is put automatically in a numerical value so that the numerical value has two decimal places even when the "." key is not depressed.

The display 7 is composed of a well-known liquid crystal display. When numerical value data/various message data output from the CPU 2 is input to the display driver 6, the display 7 is driven by the driver 6 to display numerical data such as input numerical value and the answer concerned, various message data, etc., thereon.

As shown in FIG. 3, the display window 7a is provided above the input keys on the control panel 16 to display a numerical value of up to eight figures. When there is a numerical value in a memory register of the RAM 4, "M" is lighted on the left side of the numerical value display area; during a constant numeral-based calculation which, for example, includes "c*y" where "c" is any constant numeral, "*" is any one of arithmetic operator symbols such as "+", "−", "×" and "÷", and "y" is any variable, "K" is lighted; and when an input error such as division of any particular number by 0 occurs, "E" is lighted.

In this computer 1, when a numeral is input and the same arithmetic calculation command key "+", "−", "×" or "÷" is then depressed repeatedly, the numerical value and following calculation command are fixed or locked.

Above the numerical value display area, there is a message display area where messages "PROVING", "OK", "LAST TIME", "THIS TIME", and "OVER" are displayed. In the check mode, "PROVING" is displayed; "OK" is displayed when the calculation is found to be correct as the result of the check operation; "LAST TIME" is displayed when the numerical value displayed in the check mode is the one obtained last time (in the regular calculation mode); "THIS TIME" is displayed when the displayed numerical value is the one obtained this time (in the check mode); and "OVER" is displayed when the memory overflows with data.

An operator symbol display 27 is provided at an upper left corner of the window 7a to display in the check operation an appropriate one of symbols "+", "−", "×", "÷" and "=" of calculation commands input subsequently to the numerical value displayed on the display window 7a.

The operation of the computer of this embodiment will be described next with reference to flow charts of FIGS. 4–11 and the key-in operations and data records of FIGS. 12 and 18.

[Regular Calculation Mode]

When data is input from the key-in unit 5, it is first determined whether F=0, i.e., whether the computer is in the regular calculation mode, or otherwise in the check one, in the numeral inputting key/function key operation routine (FIGS. 4, 5) (step S1).

When F is 0, it is determined whether the input data is based on the depression of the numeral inputting keys (step S2). If so, its numerical value is stored in the display register 10 and simultaneously displayed in the display window 7a, and the flag M becomes 1, which indicates that the numeral inputting keys have been depressed (step S3). When the input operations by the numeral inputting keys are performed, a corresponding numeric value of up to 8 places is displayed in the display window 7a.

When it is determined at step 2 that data has been input by a key other than the numeral inputting keys, that is, by the calculation command key in this case, it is determined whether the flag M indicating that the calculation command key has been depressed is 0 (step S4). If the flag M is 1, the input numerical value data such as 0, 1, 2, 3, 5.3 and the calculation command data (+, −, × or ÷) are stored in the input numeral memory area 14a and function memory area 14b, respectively, of the journal memory 14 designated by the address pointer $P_n$ (initially, $P_n$=P0) (step S5).

Each time a similar storage operation is repeated, the address pointer $P_n$ changes to the next address designation $P_{n+1}$ (step S6). Thus, the calculations for the input calculation data and their results are displayed sequentially, and the answer is finally displayed in the displayed window 7a (step S7). Thereafter, the flag M becomes 0 (step S8).

When the flag M is 0 at step S4, the pointer $P_n$ points out the directly previous address designation $P_{n-1}$ (step S9). Then it is determined whether the calculation command data stored in the register designated by $P_n$ and the input calculation command data are the same (step S10).

If not at step S10, that is, when different calculation command keys are depressed successively, the calculation command data stored in the register designated by $P_n$ is replaced with the input calculation command data, that is, the calculation command data produced by the later depressed calculation command key (step S11). For example, when the "+" key and then the "−" key are depressed, only the depression of the "−" key is determined to be proper and data on this key is stored in the journal register 14. When the "×" key and then "÷" are depressed, only the depression of the "÷" key is determined to be proper and data on this key is stored in the journal register 14.

Since data on the previously depressed "+" and "×" keys are not used in the calculation and corrected by the user, the data is determined to be improper and not stored in the journal register 14.

When it is determined at step S10 that the calculation command data stored in the registers designated by $P_n$ and input calculation command data are the same, it is then determined at step S12 whether the existing state is a data lock one where numeral data and following calculation command sign data are locked. If so, the data lock state is released (step S13). If not at step S12, a data lock state occurs (step S14).

The procedures at steps S5–S8 are performed in the respective states.

When the "C" key 21 is depressed in the course of the key-in operation in the regular calculation mode, the "C" key operation routine (FIG. 7) is performed. When it is determined at step S40 that the numeral inputting keys have been operated (M=1), the displayed numerical values are deleted (step S41) and the flag M becomes 0 (step S42).

Since this data keyed in by the "C" key is improper data unrelated to the calculation, it is not stored in the journal memory 14.

When the "+/−" key is then depressed, the "+/−" key operation routine (FIG. 7) is performed. When it is then determined at step S51 that a numerical value has been displayed, the sign "+" or "−" of the numerical value displayed in the display window 7a is changed to "−" or "+", respectively (step S52).

When the "+/−" key is depressed by an even number of times in succession, the keyed-in data is put in the same state as when the "+/−" is not depressed, and is not used for the calculation. Thus, all such data is determined to be improper and is not stored in the journal memory 14. When the "+/−" key is depressed by an odd number of times in succession, the data keyed in by the "+/−" key other than the data keyed in last by the "+/−" key is improper data which is not used for the purpose of calculation. Only the data keyed in last is determined to be proper and stored in the journal memory.

When the "MR" key is depressed, the "MR" key operation routine (FIG. 8) is performed. When it is determined at step S61 that the numeral inputting keys have been operated (M=0), the present displayed numerical value and its sign (+ or −) are erased and the data stored in the memory register 12 is displayed in the display window 7a (step S62), and the flag M then becomes 1 (step S63).

When the "M+" or "M−" key is depressed, the corresponding "M+" or "M−" key operation routine (FIG. 9) is performed. In the case of the "M+" key, the numerical value displayed in the display window 7a is stored as a + numerical value in the memory register 12 while in the case of "M−" key, the numerical value is stored as a—one (step S71). It is then determined at step S72 that the calculation command has been input (M=0), the displayed calculation command (function) sign is deleted (step S73).

The data keyed in by the "M+" or "M−" key is not stored in the journal memory 14.

When the "∇" key 23 is depressed, the "∇" key operation routine (FIG. 10) is performed, and it is determined at step S81 that the mode is the regular calculation mode (F=0). When it is determined at S84 that the numerical values have been keyed in by the numeral inputting keys (M=I), the least significant place of the numerical value displayed in the display window 7a is erased (step S85).

The data keyed in by the "∇" key 23 is used for the purpose of correction. In the calculation, only the corrected data is proper, so that the data keyed in by the "∇" key 23 is not stored in the journal memory 14.

[Check Mode]

When the "check" key 24 is operated after the above key-in operation has been performed in the regular calculation mode, the "check" key operation routine (FIG. 11) is performed. At step S91 it is determined whether the existing mode is the regular operation mode, and "PROVING" is displayed in the message display area of the display window 7a (step S9). After the address pointer $P_n$ becomes the initial address designation P0, the flag F becomes "1", which implies the check mode (steps S93, S94).

When the "check" key 24 is operated in the check mode, the display "CHECK" is erased (step S95) and the mode returns to the regular calculation mode (step S96).

Figure 4:
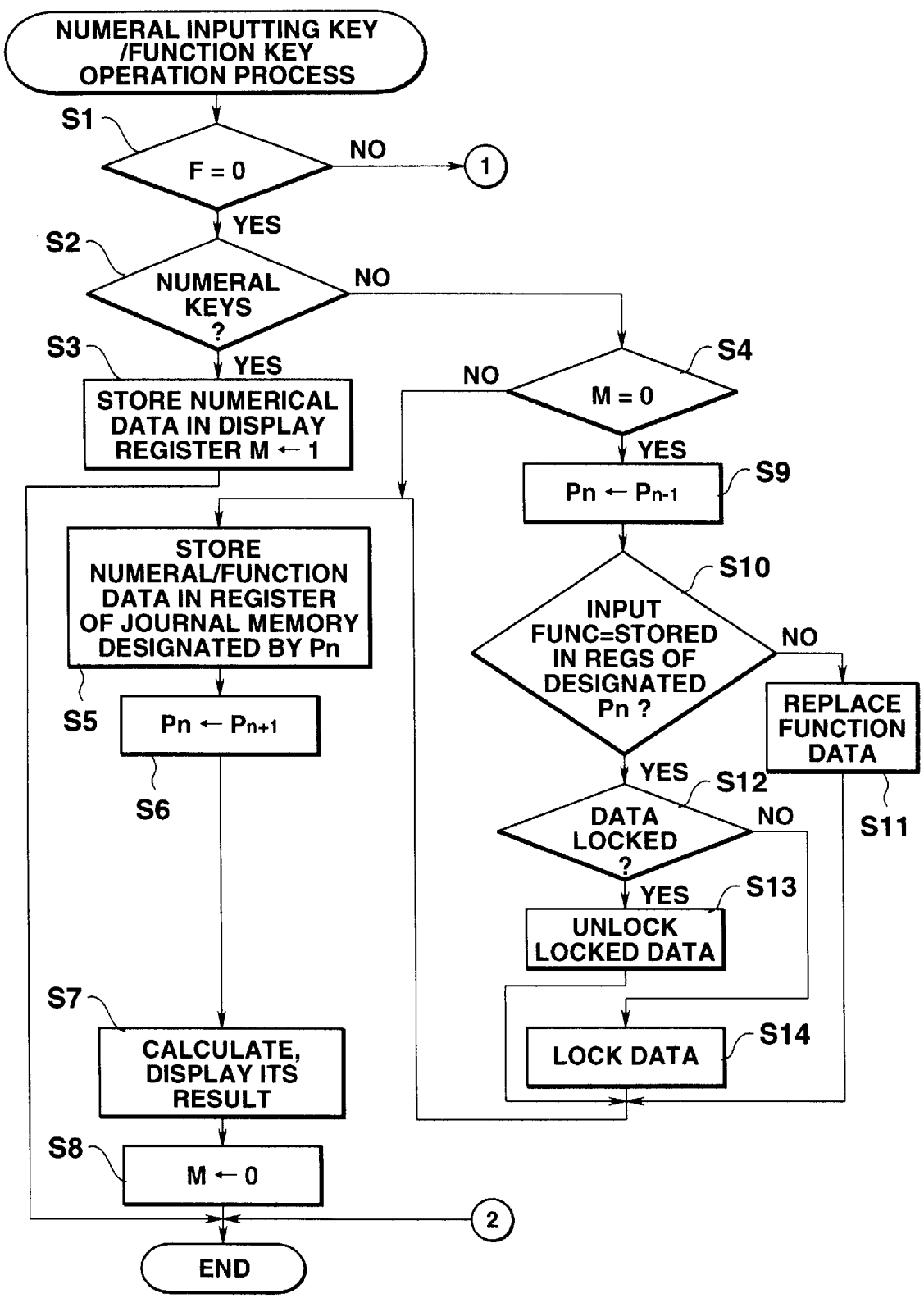
FIG. 4 is a flow chart indicative of an operation (a numeral inputting key/function key operation routine) of the computer.
Figure 5:
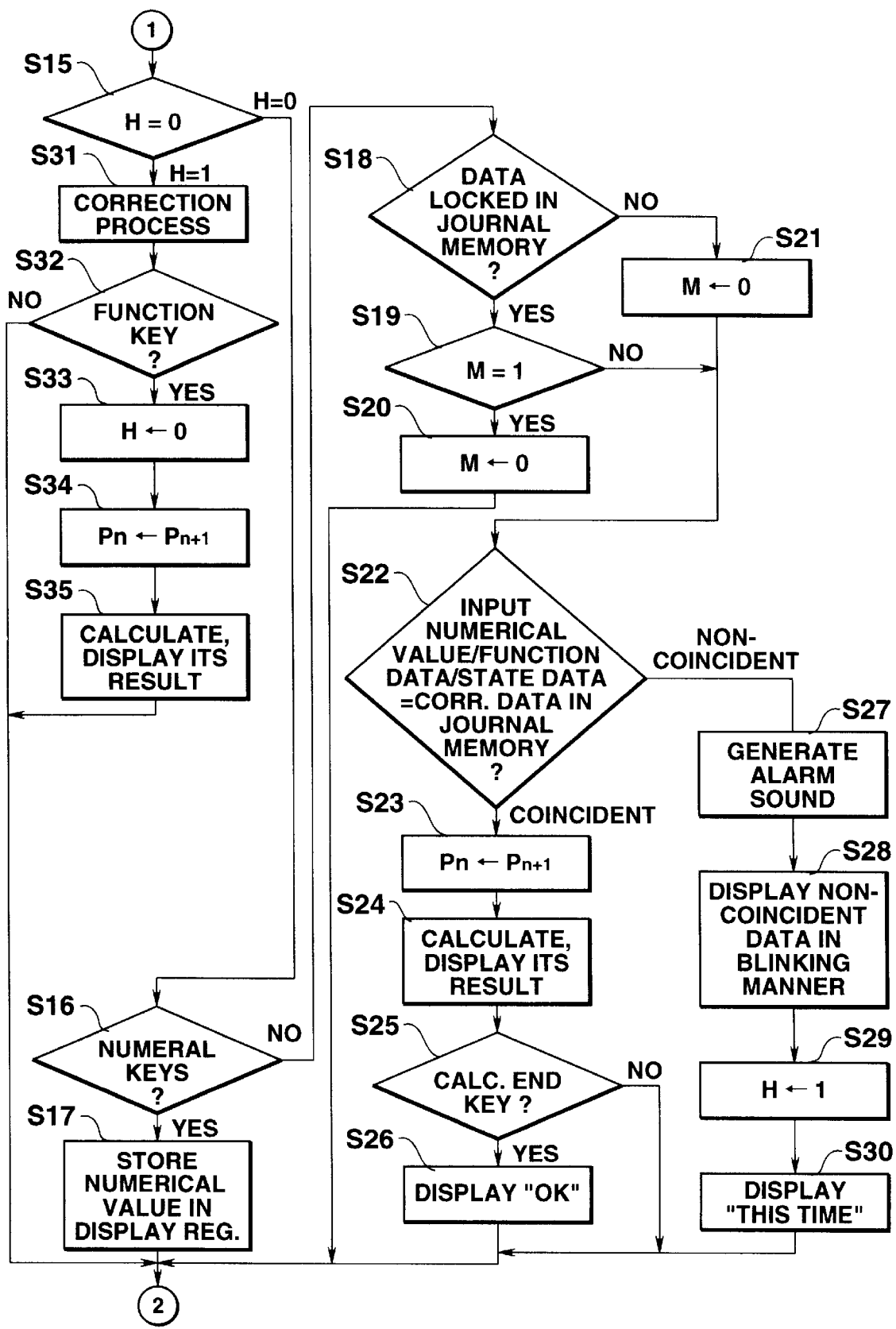
FIG. 5 is a flow chart indicative of another operation (a numeral inputting key/function key operation routine) of the computer.
Figure 6:
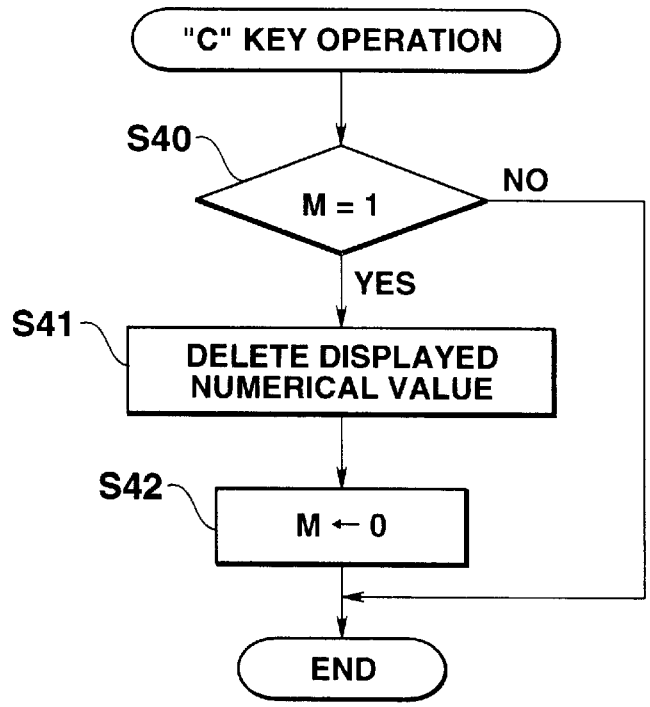
FIG. 6 is a flow chart indicative of an operation (a "C" key operation routine) of the computer.
Figure 7:
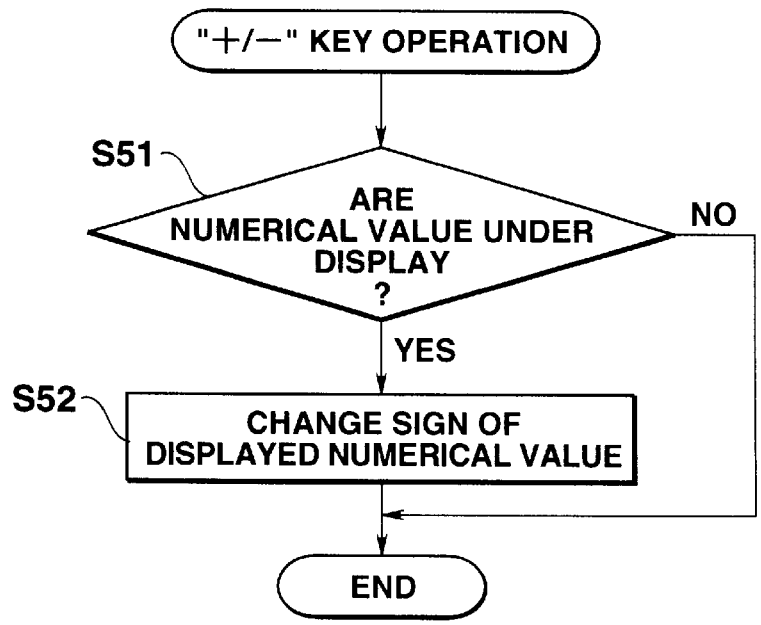
FIG. 7 is a flow chart indicative of an operation (a "+/−" key operation routine) of the computer.
Figure 8:
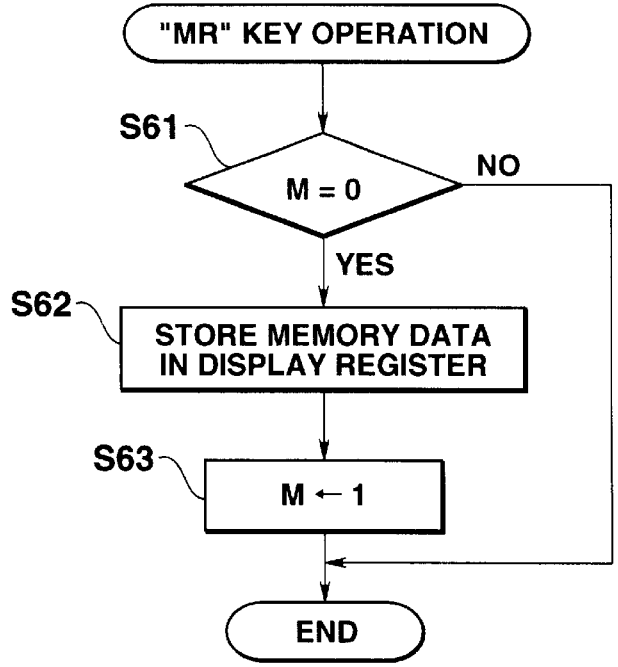
FIG. 8 is a flow chart indicative of an operation (a "MR" key operation routine) of the computer.
Figure 9:
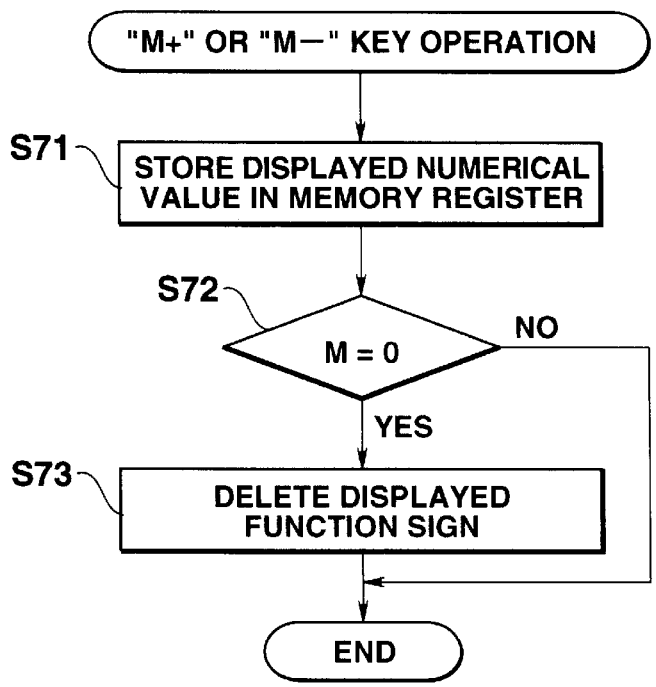
FIG. 9 is a flow chart indicative of an operation (a "M+", "M−" key operation routine) of the computer.
Figure 10:
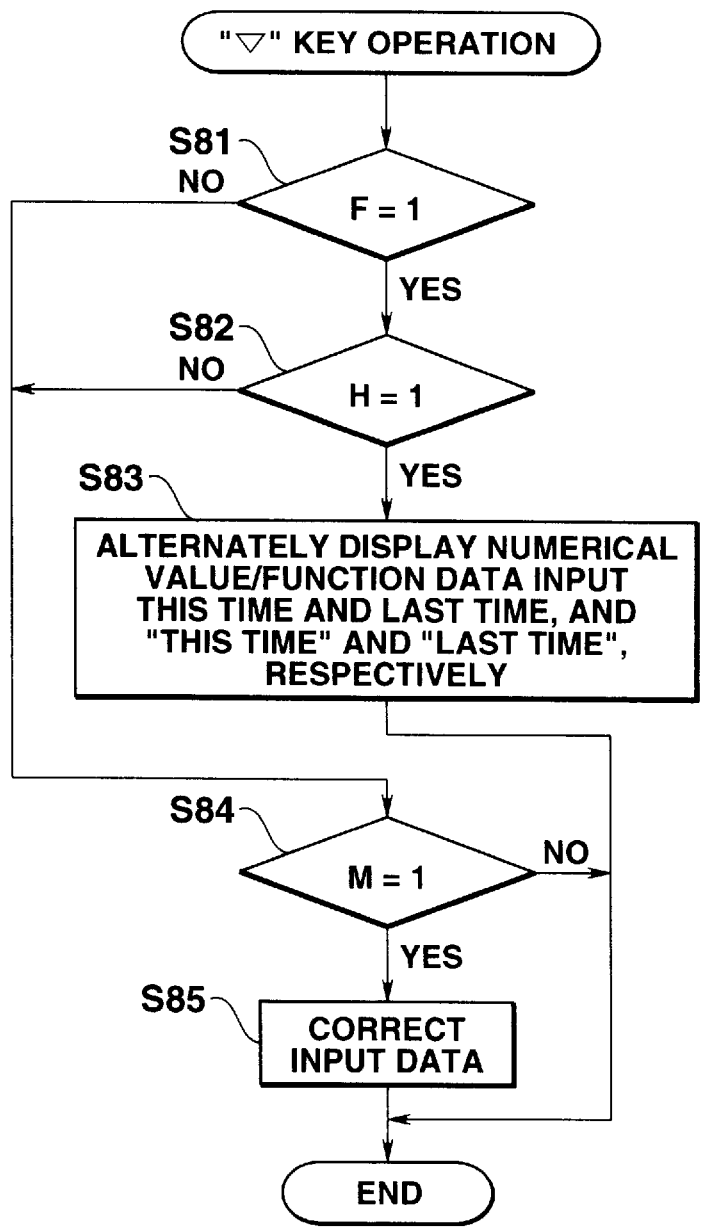
FIG. 10 is a flow chart indicative of an operation (a "▽" key operation routine) of the computer.
Figure 11:
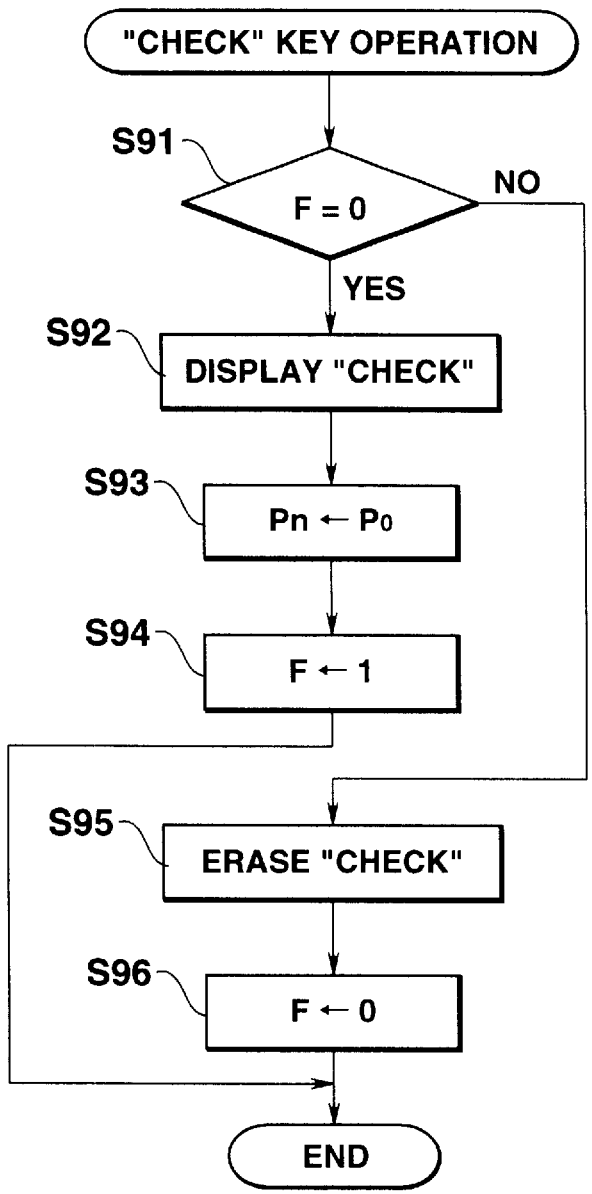
FIG. 11 is a flow chart indicative of an operation (a "check" key operation routine) of the computer.

In the check mode, the mode is determined to be the check mode at step S1 of the numeral inputting key/function key operation routine (FIGS. 4 and 5). At step S15, it is determined whether H=0, i.e., whether the mode is a correction one.

If data is input when flag H=0, it is determined whether the input data is based on the operation of the numeral inputting keys (step S16). If so, its numerical value is stored in the display register 10 and displayed in the display window 7a and the flag M becomes 1 (step S17). By performing the input operations by numeral inputting keys any number of times, a corresponding numerical value of up to 8 places is displayed in the display window 7a.

When it is determined at step S16 that the calculation command key has been operated, it is determined whether the existing state is a data lock state (step S18). If so, it is then determined at step S19 whether the flag M is 1, that is, whether numerals have been keyed in by the numeral inputting keys. If so, the flag M becomes 0 (step S20) and the control is then put in the input wait state.

When it is determined at step S18 that the state is not the data lock state, and the flag M then becomes 0 (step S21), the numerical value/calculation command data newly input this time is compared with that stored last time in the register of the journal memory 14 designated by $P_n$ for the purpose of check (step S22).

Also, when it is determined at step S19 that the flag M is 1, the control passes to step S22.

When the newly input numerical value/calculation command data coincides with the previous one stored in the journal memory 14, the address pointer $P_n$ indicates the next address designation $P_{n-1}$ (step S23). Thus, the required calculation and the display of the result of the calculation are performed (step S24).

Each time the operation of numeral inputting keys and a calculation command key is performed, the newly input numeral value/calculation command data is compared with the numerical value/calculation command data stored in a respective one of the registers of the journal memory 24 designated by $P_n$. If both coincide, the required calculation and display of the result of the calculation are performed (steps S22–S24).

When the "=" key is operated at the end of all the calculations (step S25), "OK" indicating that all the calculations are correct is displayed in the message display area of the display window 7a (step S26).

When it is determined at step S22 that the newly input numerical value/calculation command data does not coincide with the previous numerical value/calculation command data stored in the register of the journal memory 14 designated by $P_n$, an alarm sound "pi, pi, pi . . . " is generated from the speaker 7 (step S27), and the non-coincident input data is displayed in a blinking manner in the display window 7a (step S28). Thereafter, the flag H becomes "1", i.e., the mode becomes the correction mode (step S29). "THIS TIME" is then displayed in the message display area of the display window 7a (step S30).

When the "∇" key 23 is depressed, it is determined at step S81 of the "∇" key operation routine (FIG. 10) that the current mode is the check mode. It is then determined at step S82 that the current mode is the correction mode. When the "∇" key 23 is depressed repeatedly, the numerical value/ calculation command signs input last time and this time are displayed alternately and "LAST TIME" and "THIS TIME" "are correspondingly displayed alternately (step S83).

When execution of a correction input process is instructed by the key-in unit 5, a correction process is performed at step S31 of the numerical inputting key/function key operation routine. When correct data is then input by the numeral inputting keys and fixed by the calculation command key, it is determined at step S32 that the calculation command key is operated. Thus, the flag H becomes "0", and the correction mode ends (steps S33). At step S31, the corresponding data in the journal memory is rewritten with the corrected data.

After the correction process ends, the address pointer $P_n$ then indicates the next address designation $P_{n-1}$ (step S34), the required calculation is performed, and the display of the result of the calculation is performed (step S35).

Thereafter, processes similar to those at steps S22–S24 are performed. When the numerical value/calculation command data input last time coincides with that input this time, and the "=" key is then depressed (step S25), "OK" is displayed in the message display area of the display window 7a (step S26).

FIGS. 12 and 18 show illustrative key-in operations and the corresponding illustrative recording in the journal memory 14 in the regular calculation mode.

FIG. 12A shows an illustrative operation in which no input mistake has been made while FIG. 12B shows that a mistake has been made in the same numeral inputting operation as that in FIG. 12A. In the operation of FIG. 12B, there was the mistake in the numeral inputting operation, so that the "∇" key 23 was operated, the least significant figure "2" of the numerical value "202" displayed at that time was erased and a correct numerical value "0" was input. In this case, the data keyed in by the "∇" key 23 and the erased numerical value "2", data are determined to be invalid and not stored in the journal memory 14.

FIG. 12C shows an illustrative operation in which no input mistake has been made while FIG. 12D shows that a mistake has been made in the same numeral inputting operation as that in FIG. 12C. In the operation of FIG. 12D there was the mistake in the numeral inputting operation, so that the "C" key 21 was operated to erase the numerical value "50" displayed at that time and a correct numerical value "20" was input instead. In this case, the data keyed in by the "C" key 21 and the numerical value "50" data erased by the "C" key 21 were cleared in the correction. Thus, they were determined to be invalid in the calculation and not stored in the journal memory 14.

As described above, even when a mistake is made in the numeral inputting operation and erased and corrected in the regular calculation mode, the erased input operation command data and the erased numerical value data are not stored in the journal memory 14. Thus, a meaningless operation in the check operation is omitted which includes making a mistake on purpose in the numeral inputting operation, erasing and correcting the mistake.

FIG. 13 shows an illustrative operation including switching the sign of a numerical value by the "+/−" key. (A) to (F) of FIG. 13 show the cases where the "+/−" key was operated an odd number of times while (D) to (F) of FIG. 13 show the cases where the "+/−" key was operated an even number of times.

(A), (B) and (C) of FIG. 13 show that the "+/−" key was operated once, three times and four times, respectively. In any one of these cases, only the data keyed in last by the "+/−" key is determined to be proper and stored in the journal memory 14.

(D), (E) and (F) of FIG. 13 show that the "+/−" key was operated 0 times, twice and four times, respectively. In those cases, the keyed-in sign of the numerical value returns to its original one. Thus, the data keyed in by the "+/−" is determined to be all improper and the data keyed in by the "+/−" key is not stored in the journal memory 14.

As described above, even when the sign switching operation is performed repeatedly by the "+/−" key in the regular calculation mode, data keyed in meaninglessly by the "+/−" is not stored in the journal memory 14. Thus, a meaningless operation of switching the sign in the check operation is omitted.

FIG. 14 shows illustrative operations of the computer including a release operation performed when an error (or an input invalidation state) due to an inhibit operation has occurred. (A) of FIG. 14 shows an illustrative operation including removal of an error which has been caused by a calculation for a numerical value exceeding a maximum numerical value which the computer 1 is able to process. In this example, "2" was added to a maximum numerical value "99 . . . 99" to find the answer and the "C" key 21 was then depressed for removing an error which occurred. The data keyed in by the "C" key was determined to be improper and was not stored in the journal memory 14.

(B) of FIG. 14 shows an illustrative operation including removal of an error which occurred due to an meaningless operation which included the division of a numerical value by 0. In this example, "100" was divided by "0" to find the answer and the "C" key 21 was depressed to eliminate the error. In this case, the data keyed in by the "C" key 21 was determined to be improper and was not stored in the journal memory 14.

(C) of FIG. 14 shows an illustrative operation including removal of an error which occurred due to an improper operation which includes extraction of the square root of a negative number. In this example, the square root of "−2" was extracted and the "C" key 21 was depressed to eliminate the error. In this case, the data keyed in by the "C" key 21 was determined to be improper and was not stored in the journal memory 14.

As described above, even when an error removal operation was performed by the "C" key in the regular calculation mode, the data keyed in by the "C" key was not stored in the journal memory 14. Thus, a useless "C" key operation is omitted in the check operation.

FIG. 15 shows an illustrative operation which includes the update and correction of a wrong operation command (function) based on the depression of a wrong calculation command key by the depression of a correct calculation command key.

In (A) of FIG. 15, no proper "−" key was not depressed after a numerical value "123" was keyed in, but the "+" key was depressed. Thus, the calculation command was updated and corrected by the depression of the "−" key. The data keyed in last time by the "+" key was determined to be improper and not stored in the journal memory 14.

In (B) of FIG. 15, the "+" and "−" keys were operated after a numerical value "123" was keyed in, and the "×" key was then depressed, so that the calculation command was updated and corrected. The data keyed in by the "+" key was determined to be improper when the "−" key was depressed. Thus, it is not stored in the journal memory 14. The data keyed in by the "−" key was determined to be improper when the "×" key was depressed. It is not stored in the journal memory 14.

As described above, even when the inputting operation of updating the previously input calculation command is performed in the regular calculation mode, the previously input calculation command data is determined to be improper and not stored in the journal memory 14. Thus, in the check operation, useless inputting, updating and correcting operations are omitted.

FIG. 16 shows an illustrative operation including a data lock operation. (A) and (B) of FIGS. 16 each show the case where the calculation command key was operated an even number of times while (C) and (D) of FIG. 16 each show the case where the calculation command key was operated an odd number of times.

In (A) of FIG. 16, the calculation command key was operated twice. In (B) of FIG. 16, the calculation command key was operated four times in which the data lock state was temporarily released when the third calculation command key operation was performed. Thus, the first and second key operations were determined to be improper. In any of the cases, the input data for two operations is stored in the journal memory 14.

(C) of FIG. 16 shows that the "+" key was operated once. (D) of FIG. 16 shows that the "+" key was operated three times, at which time the data lock state was released. Thus, the first and second operations were determined to be improper. In any of the cases, the input data for one operation is stored in the journal memory 14.

As described above, even when the data locking and unlocking operations are performed repeatedly in the regular calculation mode, the input data released from its data lock state is not stored in the journal memory 14. Thus, meaningless repetition of the data locking and unlocking operations are omitted in the check operation.

FIG. 17 shows illustrative operations including keying operations invalidated by the subsequent key-in operation. In (A) of FIG. 17, by the operation of the "MR" key, the directly preceding numeral data "12" was invalidated. In (B) of FIG. 17, by the operation of the "MR" key, the directly preceding data input by the "+/−" key was invalidated. As a result, in any of the cases, the same keyed-in data as that in (C) of FIG. 17 was stored in the journal memory 14.

(D) of FIG. 17 shows that numerical data "786" was keyed in after the operation of the "+/−" key so that the data keyed in by the "+/−" key was invalidated. As a result, the same keyed-in data as that in the case of (E) of FIG. 17 which involved no operation of the "+/−" key was stored in the journal memory 14.

As described above, even when an inputting operation has been performed which invalidates the directly preceding operation in the regular calculation mode, the invalidated keyed-in data is not stored in the journal memory 14. Thus, a useless operation such as would be eventually invalidated by the next key-in operation in the check operation will be omitted.

FIG. 18 shows illustrative operations of other keys. (A) and (B) of FIG. 18 show that the "MR" key was operated three times and twice, respectively. In any of those cases, only the data keyed in by the last operation is determined to be proper. This state is the same as that obtained by the single operation of the "MR" key, as in (C) of FIG. 18. In this case, the data stored in the "MR" (shown as [MR] in FIG. 18) is stored in the journal memory 14.

(D) of FIG. 18 shows that the "√" key and the "+" key were operated in succession, that the calculation command was updated by the "+" key, and the "C" key was then depressed to erase the data keyed in by the "×" key. In this case, the data keyed in by the "+" key was determined to be improper when the "×" key was depressed, the data keyed in by the "×" key was determined to be invalid when the "C" key was depressed, and the data keyed in by the "C" was determined to be improper. Thus, no data which was determined to be invalid is stored in the journal memory 14.

(E) of FIG. 18 shows that the "√" key and "C" key were operated in succession. In this case, the data keyed in by the "C" key was determined to be improper and not stored in the journal memory 14.

As described above, according to the computer of this embodiment, invalid input data required for calculation in the regular calculation mode is not stored in the journal memory 14, but only valid data is stored. Thus, in the check operation, a useless key-in operation is omitted and operability is improved.

According to the computer of this embodiment, useless input data is not stored in the journal memory 14, so that the journal memory area 14 is reduced compared to the conventional one, and the differential storage area between the original and reduced storage areas can be used effectively as another data storage area. Alternatively, the use of a RAM 4 having a reduced capacity compared to the conventional one may reduce the cost of the computers.

It is to be noted that the illustrative key-in operations and corresponding records are only a few of examples illustrated for helping the present invention to be understood. Even in various key-in operations other than those illustrated above, storage of improper input data into the journal memory 14 is limited and useless key-in operations are omitted in the check operation, of course.

Second Embodiment:

The circuit configuration and external structure of a computer as the second embodiment of the present invention are the same as FIGS. 1 and 3, respectively, and further description thereof will be omitted.

Figure 19:
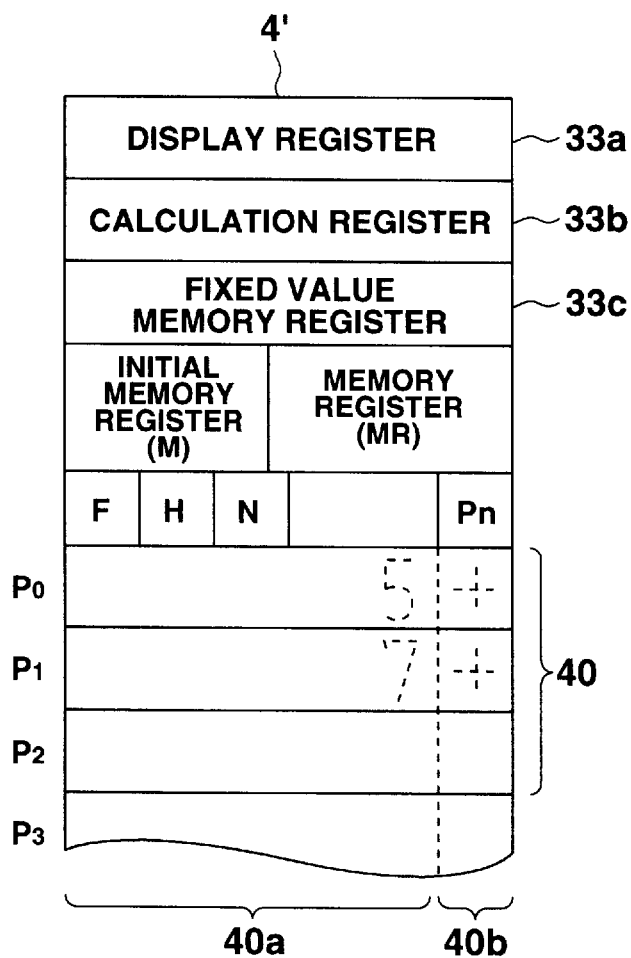
FIG. 19 illustrates the register structure of a RAM of a computer with a check function as a second embodiment.

FIG. 19 shows the register structure of a RAM 4' of the computer as the second embodiment.

The RAM 4' includes a display register 33a which stores, as bit map data, data to be displayed on a liquid crystal display 7a, a calculation register 33b which temporarily stores operands and operators involved in the course of the calculation process and the results of the calculations; a fixed value memory 33c in which calculation data fixed in accordance with the operations of function keys in the check/correction mode are sequentially stored and updated; a journal memory 40 which includes pairs of a numeral register 40a and a function register 40b in which corresponding pairs of numerical data involved and function data which constitute calculation data are sequentially stored in accordance with progress of the calculations concerned; a memory register MR which stores numerical data involved in a memory calculation which includes the operation of a memory function key group 15; an initial memory register M which stores numerical data transferred from the memory register MR when the "AC (all clear) key" is operated at the beginning of the calculation; a check mode register F in which a flag is set in the set check mode; a correction mode register H in which a flag is set in a set correction mode; a correction non-coincidence register N in which a flag is set when checked and corrected numerical data/function data is not coincident with the preceding data; and a pointer register $P_n$ which sequentially designates the storage positions of calculation data stored in the journal memory register 40.

A speaker 9 generates a sound confirming a key operation and a sound reporting that calculation data which is not coincident with the preceding data has been input in the check mode.

The operation of the computer of the second embodiment will be described next. A first calculation process to be checked will be described next. When the numeral inputting key group 17 of the key-in unit 5 is operated to input a calculation expression in a regular mode in a numeral inputting key/function key operation process of FIG. 20, it is determined whether "0" has been set in the check mode register F of RAM 4', that is, the existing operational mode of the CPU 2 is not the check mode, but the regular mode (step T1).

Further, it is determined whether a numeral inputting key has been operated and hence the keyed-in numeral data is written into the display register 33a of RAM 4' and displayed in the numeral/sign display area of the liquid crystal display 7a (step T1→T2→T3).

In this way, when numeral keys are sequentially operated to input and display corresponding operand or numeral data of a desired calculation expression. For example, when an operator key of the calculation function key group 18 is operated, it is determined that "0" has been set in the check mode register F of RAM 4', that is, that the operative mode of the computer is not the check mode, but the regular mode, and that no numeral inputting keys have been operated. Thus, the numerical data keyed in by the operation of the numeral keys and the function data keyed in by the operator key are stored in the numerical register 40a and function register 40b, respectively, of the journal memory 40 designated by a pointer register $P_n$ (its initial value "n"=0) of RAM 4' (step T1→T2→T4).

When the calculation data composed of numerical data and function data for one unit is input, displayed and stored in the journal memory 40, the value n of the pointer register $P_n$ which designates the journal memory 40 is incremented by one, a calculation process for the input numerical data and function data is performed, data on the result of the calculation is written into the display register 33a and displayed in the numeral/sign display area of the display 7a (steps T5, T6, T7).

As described above, by performing the inputting operation and display of individual numerical data and function data for the calculation expression desired by the user, calculation data composed of pairs of a numeral and a function are stored in the registers of the journal memory 40 designated by sequentially by the pointer register $P_n$, the corresponding calculation is performed, and the result of the calculation is displayed (steps T1–T7).

Figure 22:
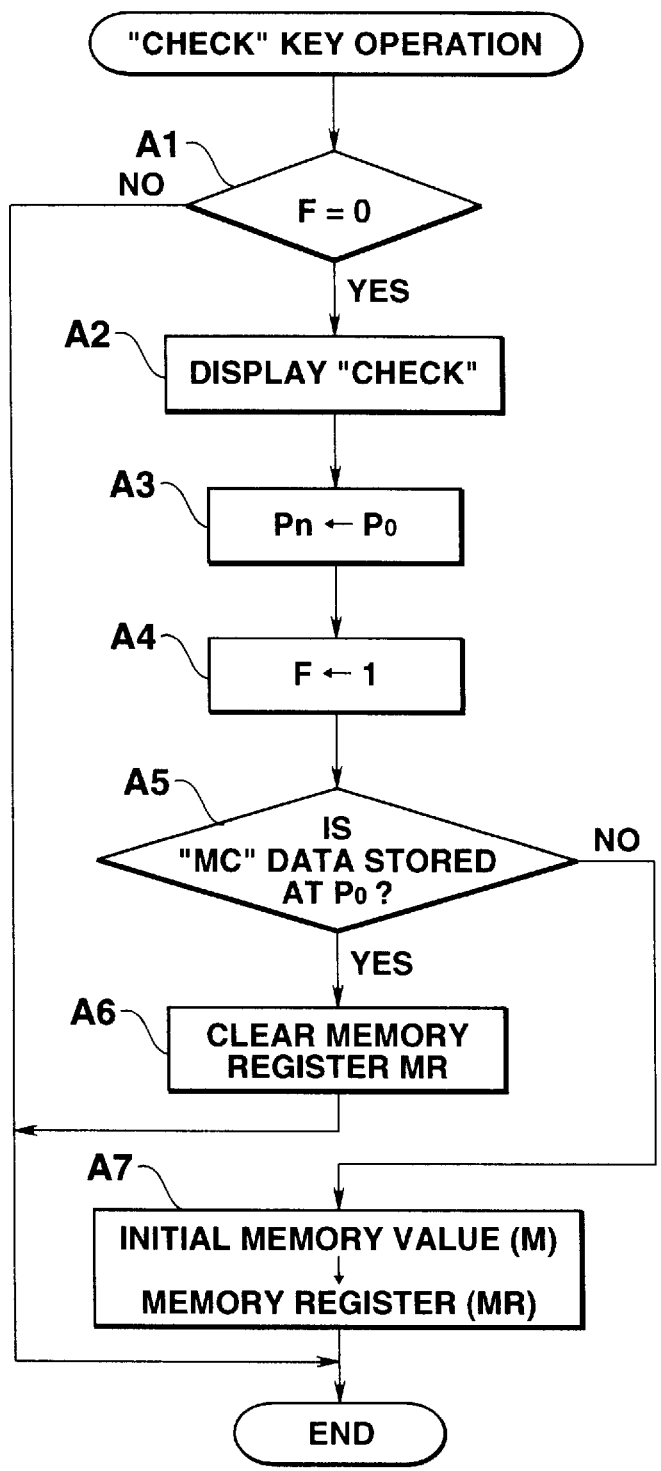
FIG. 22 is a flow chart indicative of a "check" key operation in the computer as the second embodiment.

In this situation, when the "check" key 24 of the key-in unit 11 is depressed to check the first calculation expression, the "check" key operation of FIG. 22 starts.

In this case, it is determined that "0" has been set in the check mode register F of RAM 4', that is, that CPU 2 has still been in the regular mode, and, as shown in FIG. 26A[*a*], a message "PROVING" indicating that the check mode has been set is displayed in the display 7 (step A1→A2).

In response to this operation, the value n of the pointer register $P_n$ indicating a relevant register of the journal memory 40 of the RAM 4' is reset at "0" and the check mode setting flag is set at "1" in the check mode register F (steps A3, A4).

It is then determined whether function data indicative of "MC (memory clear)" is stored at address P0 in the journal memory 40, that is, whether the "MC" key of the memory function key group 20 had been operated first when the first calculation expression was input (step A5). If so, the memory register MR is cleared to "0" (steps A5→A6).

When it is determined at step A5 that the answer is "NO", that is, that no function data indicative of "MC" has been stored at address P0 in the journal memory 40, and that the "MC" key had not been operated first when the first calculation expression was input, the data stored in the memory register MR at the beginning of the inputting operation of data on the first calculation expression becomes the initial memory value stored in the initial memory register M. Thus, the initial value stored in the initial memory register M is transferred to and set in the memory register M (step A5→A7).

In this way, in order to input data on a second calculation expression in a key-in program similar to that used to key in data on the first calculation expression, in a state in which the CPU 31 has been set in the check mode and the memory register MR of RAM 4' has been set at the same memory data as that present at the beginning of the inputting operation of data on the first calculation expression, numeral keys and an operator key can be operated to input, for example, "123" and "+", as shown in FIG. 26A[*b*]. In this case, it is first determined when the numeral keys "123" were depressed that the content of the check mode register is not "0", but "1" in the numeral inputting key/function key operation process of FIG. 20. Thus, the computer control shifts to the check mode process of FIG. 21, where it is determined whether "1" has been set in the correction mode register H, that is, the computer has been set in the correction mode (step T1→T8).

In this case, it is determined that "0" has been set in the correction mode register H, that is, the computer has not been set in the correction mode. Thus, it is determined that the "123" has been keyed in by the numeral inputting keys, and written into the display register 33*a* and displayed in the display 7*a* (step T8→T9→T10).

Subsequently, after it is determined that the data "+" has been keyed in not by the numeral inputting keys but by a function key when the operator "+" key was operated, and it is further determined that it has not been keyed in by the "=" key, it is then determined whether one-unit calculation data composed of numeral and function data "123" "+" input this time and written in the display register 33 and displayed in the display coincides with the corresponding preceding input calculation expression data stored in a relevant register of the numeral register 40*a* and function register 40*b* of the journal memory 40 indicated by the pointer register $P_n$ (step T1→T8→T9→T11→T12).

If so, the value n of the pointer register $P_n$ for the journal memory 40 is incremented by one, a calculation process for the calculation data input this time and determined to be coincident is performed and data on the result of the calculation is displayed in the display 7*a* (step T12→T13, T14, T15).

In response to this operation, it is determined whether the check operation has ended, that is, data on the whole calculation expression to be checked this time has been input and checked by the operation of the "=" key. If not, depression of subsequent numeral inputting keys or function key for the calculation expression to be checked is awaited (T16→T1).

Each time a function key is operated which involves the inputting operation of the calculation expression to be checked this time, it is determined whether the one-unit calculation data input this time coincides with corresponding data of the calculation expression input last time (step T1→T8 to T16→T1). When it is determined at step T12 that, for example, the calculation data input this time, which is "123" "+", is not coincident with the calculation data input last time which is "234" "+", stored in the journal memory 40, an electronic sound "pi, pi, . . . " which reports that there are the calculation data which are not coincident with each other is output through the amplifier 8 and speaker 9, as shown in FIG. 26A[*b*] (step T12→T17).

The display 7*a* displays calculation data "123" "+" input this time and determined to be non-coincident with the data stored in the journal memory 40, the "MESSAGE INPUT THIS TIME" indicative of the calculation data input this time, and a "CORRECT" message indicating that the correction mode has been set now (step T18).

In response to this display, the correction mode setting flag is set at "1" in the correction mode register H of RAM 4', and the operational mode of the CPU 2 is changed to the correction mode (step T19).

Figure 24:
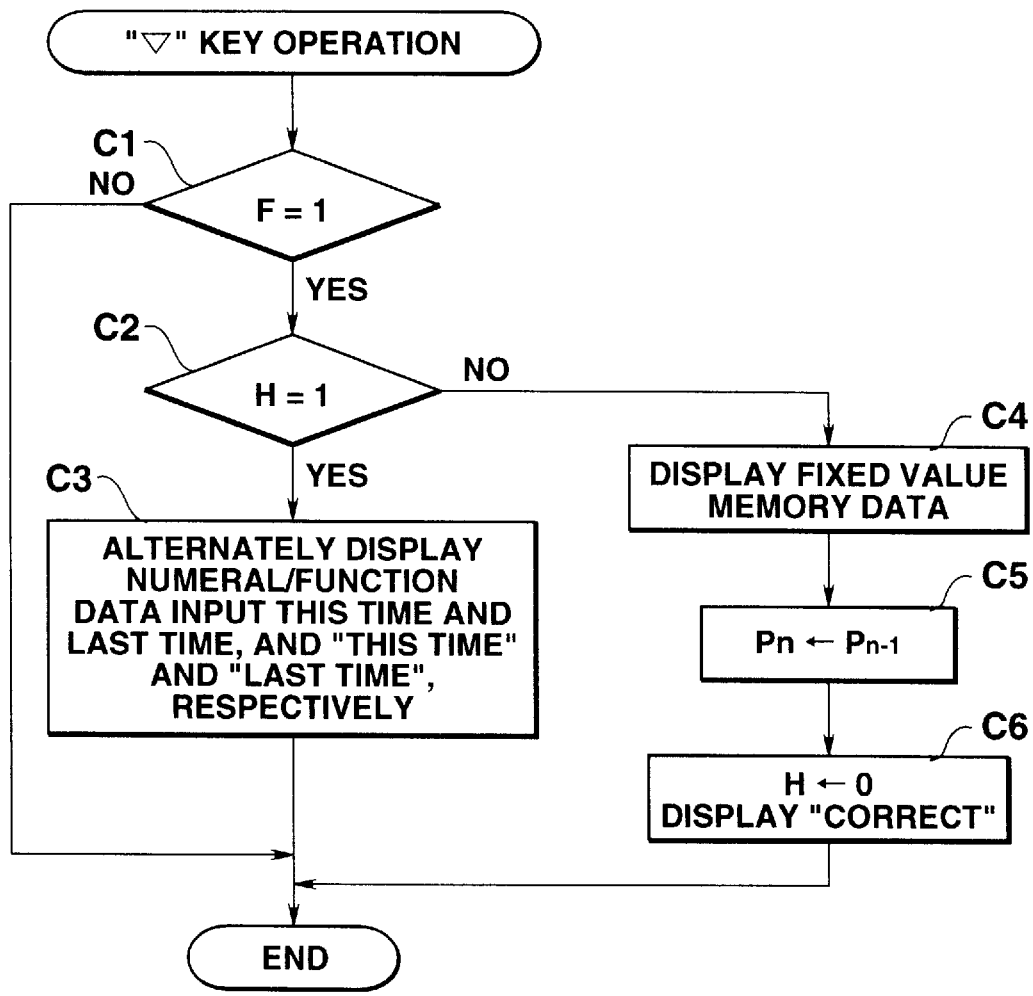
FIG. 24 is a flow chart indicative of a "∇" key operation in the check mode of the computer as the second embodiment.
Figure 25:
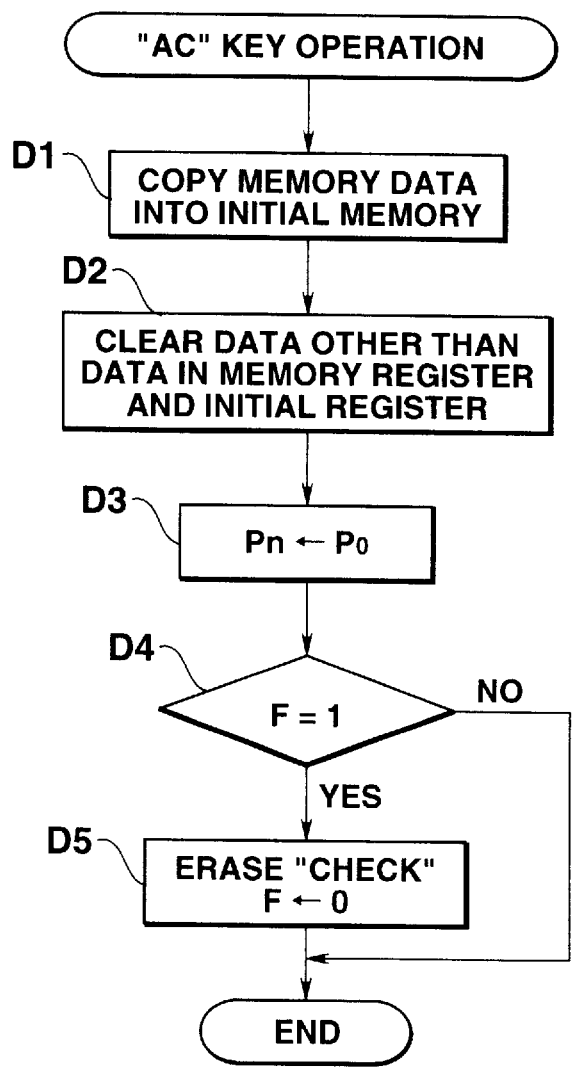
FIG. 25 is a flow chart indicative of an "AC" key operation of the computer as the second embodiment.

When the "∇" key 23 of the key-in unit 16 is depressed, as shown in FIG. 26A[*c*], in a state where the calculation data input this time and determined to be partially non-coincident with the data stored last time in the journal memory in the check mode operation of the numeral inputting key/function key operation process, and the messages "THIS TIME" and "CORRECT" have been displayed, the "∇" key operation process of FIG. 24 starts.

At this time, it is determined that the check mode register F of RAM 4' has been set at "1", that is, that the check mode has been set, and that the correction mode register H has been set at "1", that is, that the correction mode has been set. When the "∇" key is then depressed repeatedly, a data group of the calculation data "123" "+" input this time and determined to be non-coincident and the message "THIS TIME", and a data group of the corresponding calculation data "234" "+" input last time and the message "LAST TIME" are alternately displayed in the display 7. Thus, it is confirmed at which point both the calculation data input this time and last time are non-coincident with each other (step C1→C2→C3).

In this case, it is confirmed in FIG. 26A[*b*] and [*c*] that the numeral data "123" of the calculation data input this time is non-coincident with the numeral data "234" of the calculation data input last time.

Figure 20:
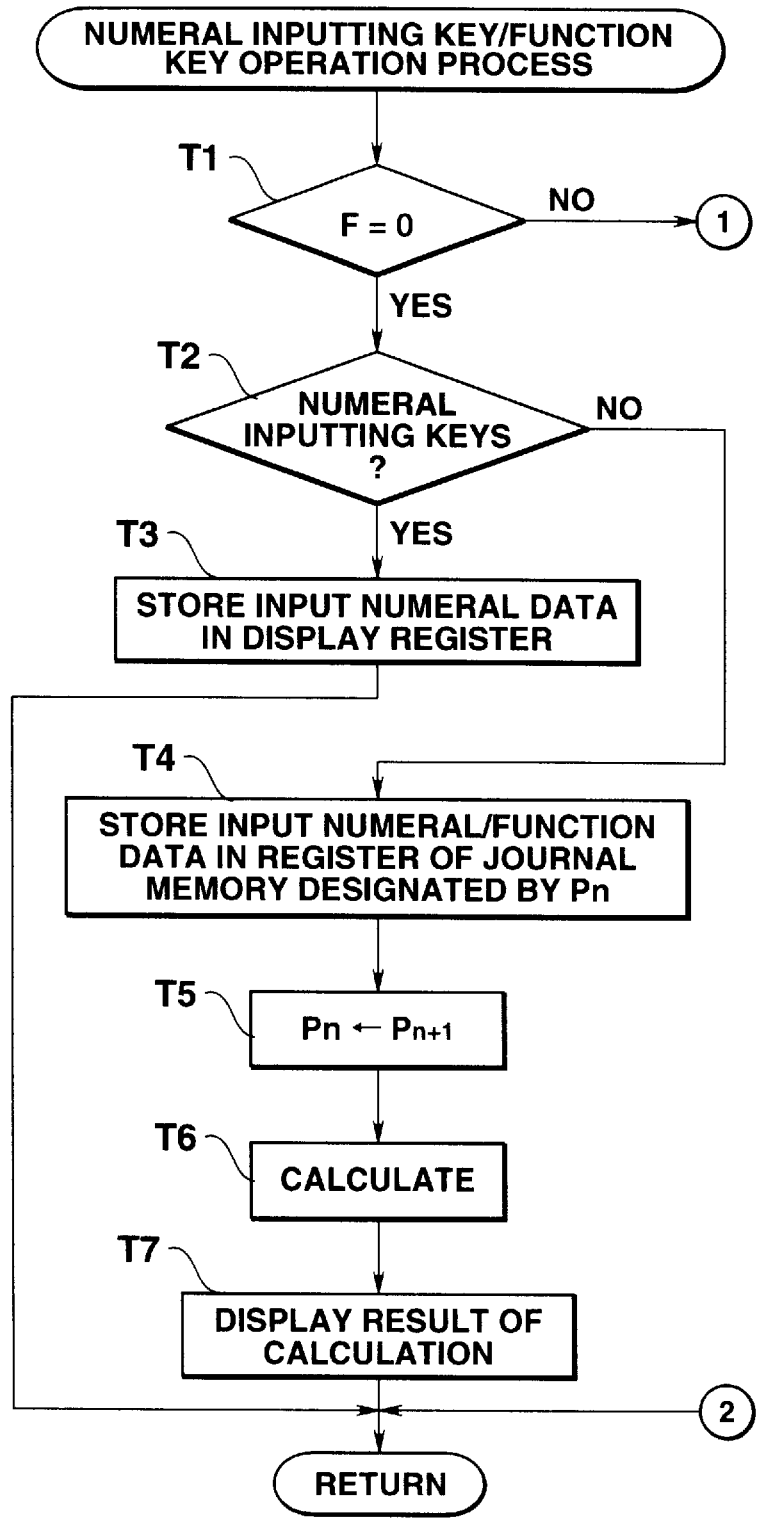
FIG. 20 is a flow chart indicative of a regular mode operation of the numeral inputting key/function key operation routine) of the computer as the second embodiment.
Figure 21:
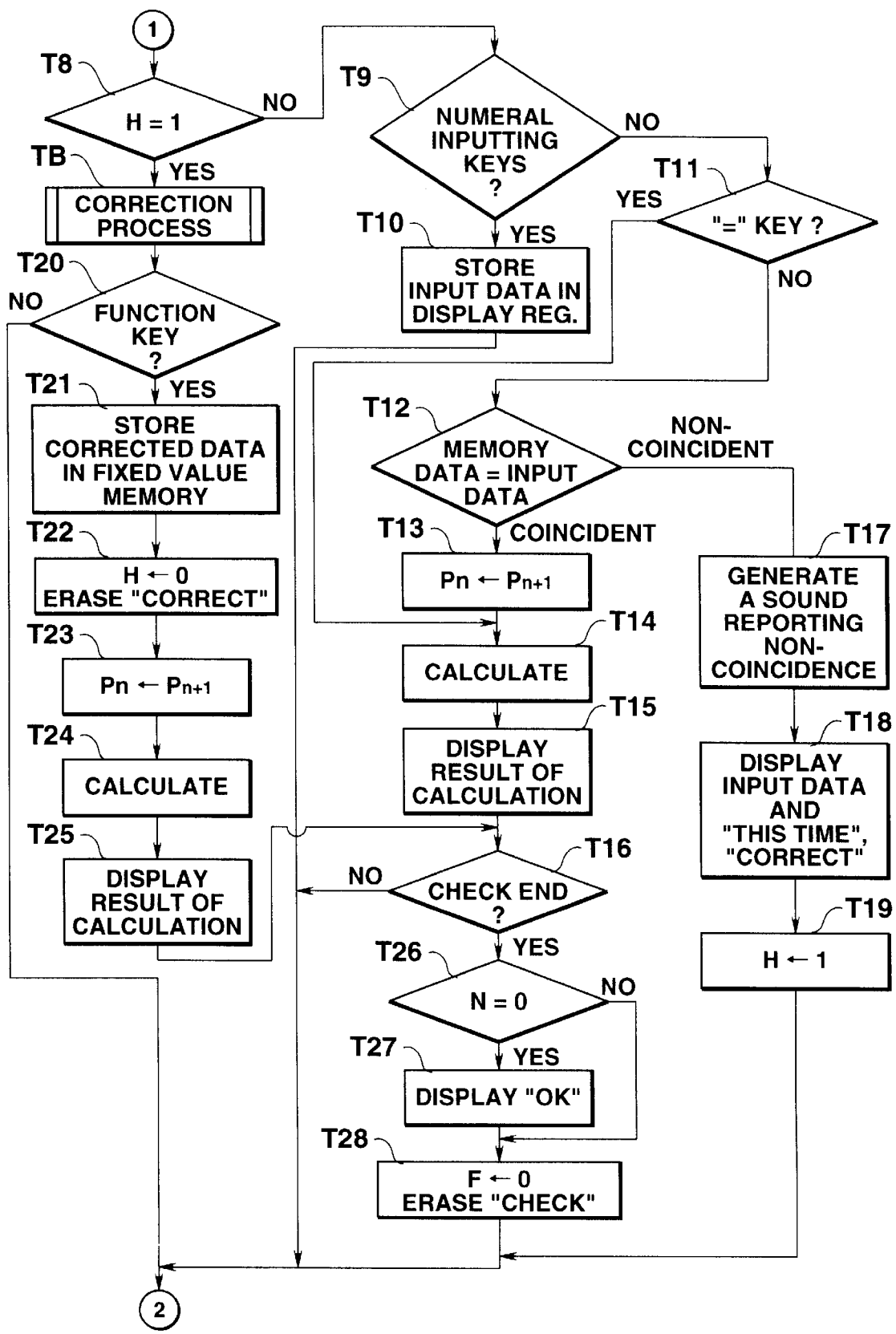
FIG. 21 is a flow chart indicative of a check mode operation of the numeral inputting key/function key operation routine) of the computer as the second embodiment.

When the "+" key is depressed as shown in FIG. 26B[*a*] in a state where the correct one of the calculation data "123" "+" and "234" "+" input this time and last time, respectively, and determined to be non-coincident with each other is displayed by the depression of the "∇" key 23, the control passes to the numerical value inputting key/function key operation process of FIGS. 20 and 21, where it is determined that the check mode register F is not "0", i.e., is in the check mode and that the correction mode register H is "1", i.e., in the correction mode. Thus, the control passes to the correction process of FIG. 23 (step T1→T8→TB).

Figure 23:
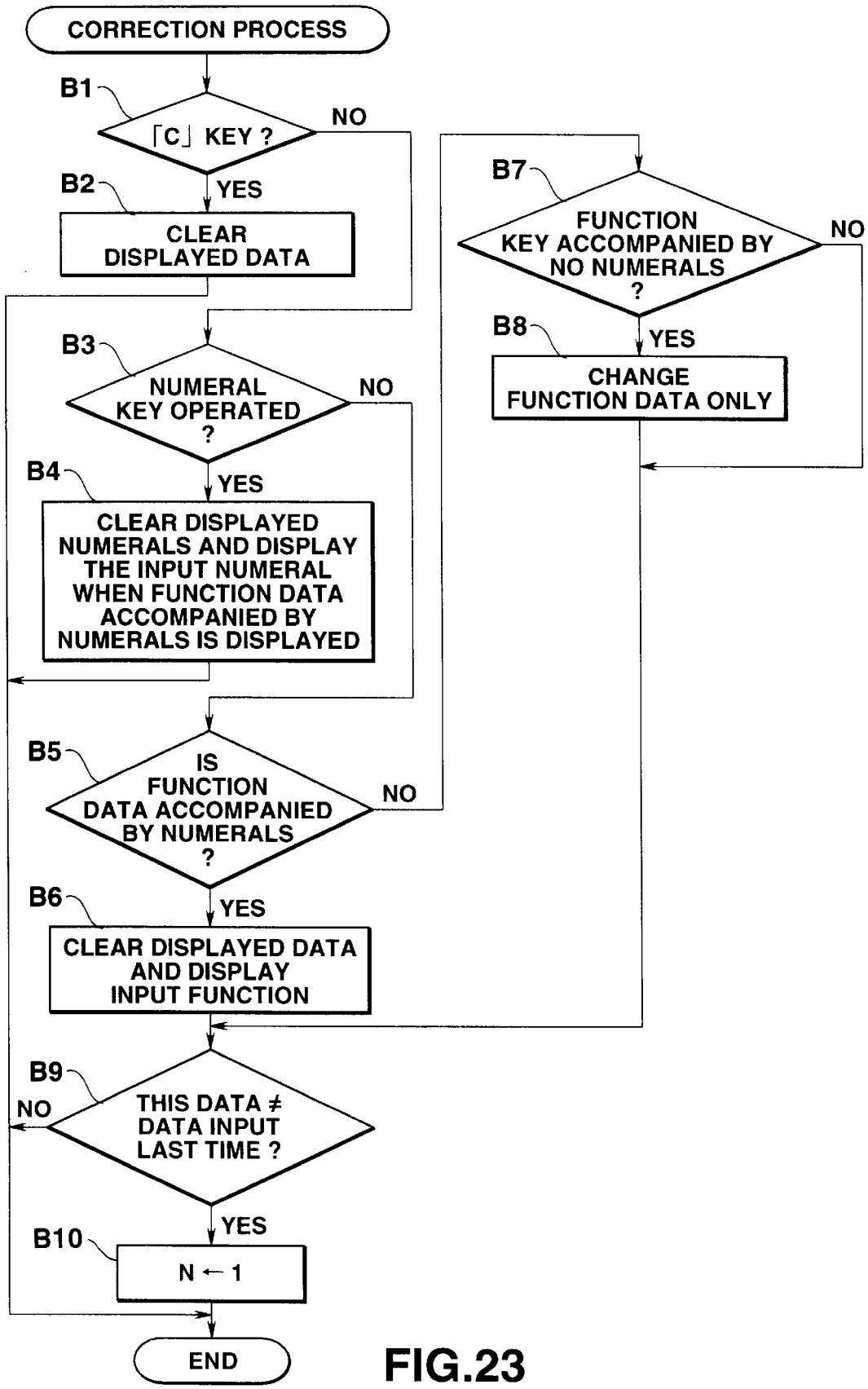
FIG. 23 is a flow chart indicative of a correction operation in the check operation mode in a numeral inputting key/function key operation routine of the computer as the second embodiment.

In response to this operation, the operation of the "+" key is determined to be the operation of a function key accompanied by no numerals in the correction process of FIG. 23. Thus, the function data of the calculation data displayed at present is changed to data "+", which is then displayed (unchanged in this case). In addition, it is determined whether the displayed calculation data is different from the calculation data input last time, that is, whether the calculation data input this time is in the correction process or otherwise whether the calculation data input last time is determined to be correct (step B7→B8, B9).

For example, as shown in FIG. 26A[b], in a state where the calculation data "123" "+" input this time is displayed and when the "+" key is depressed by determining that the displayed calculation data "123" "+" input this time is correct, as shown in FIG. 26B[a], it is determined that the calculation data "123" "+" input this time is different from the calculation data "234" "+" input last time and stored in the journal memory 40. Thus, the correction non-coincidence flag "1" is set in the correction non-coincidence register N of RAM 33 (step B9→B10).

For example, as shown in FIG. 26A[c], in a state where the calculation data "234" "+" input last time is displayed and when the "+" key is depressed by determining that the displayed calculation data "234" "+" input last time is correct, as shown in FIG. 26B[a], it is determined that this data is the same as the calculation data "234" "+" input last time and stored in the journal memory 40. Thus, the correction non-coincidence flag "1" is not set in the correction non-coincidence register N (step B9→END).

When the control then returns from the correction process of FIG. 23 to the check mode operation of the numeral inputting key/function key operation process of FIG. 21 and when it is then determined that the operation of the "+" key has been performed by a function key, the calculation data (in this case, "123" "+" or "234" "+") corrected and fixed by the operation of the function key is stored in the fixed value memory register 33c of RAM 4' (step TB→T20→T21).

In response to this operation, "0" indicative of a release of the correction mode is set in the correction mode register H, the message "CORRECT" displayed in the display 7 is erased, the pointer $P_n$ indicative of a relevant register of the journal memory 40 is incremented by one, and the calculation data of the calculation expression input last time and to be checked is further updated (steps T22, T23).

A calculation process for the corrected and fixed calculation data is then performed and data on the result of the calculation is then displayed (steps T24, 25).

When the "∇" key 23 is depressed, for example, as shown in FIG. 26C[a], in a state where the calculation data input last time and to be checked has been further updated after the correcting and fixing process based on the depression of the function key, the "∇" key operation process of FIG. 24 is started up.

When the "∇" key operation is started up, it is determined that "1" has been set in the check mode register F of RAM 4', that is, that the check mode has been set as well as that "0" has been set in the correction mode register H, that is, that the correction mode has been released. At step T21 the corrected and fixed calculation data stored in the fixed value memory register 33c of RAM 4' is read and displayed, for example, as "234" "−" in the display 12 (step C1→C2→C4).

In response to this operation, the value n of the pointer $P_n$ indicative of a relevant register of the journal memory 40 of RAM 4' is decremented by one, the calculation data to be checked is returned to its normal state where the data is not yet fixed, the correction mode register H is again set at "1" to be thereby set the correction mode, and a message "CORRECT" is again displayed on the display 12 (steps C5,C6).

When the "C (clear)" key 21 is depressed, as shown in FIG. 26B[b], in the passage to the correction process of FIG. 23, the displayed calculation data (for example, "234" "+") is erased temporarily, and the control passes to a state where it waits for the next inputting operation of numerals or the depression of the function key (step B1→B2→S20→S1).

As shown in FIG. 26B[c], if function data such as "MR" accompanied by numeral data has been displayed when the numeral key "2" is depressed, the numeral data is erased and the input numeral "2" is displayed. If numeral data and function data (such as "234" "+") not accompanied by numeral data have been displayed when the numeral key "2" is depressed, only the numeral data "234" is erased and the input numeral data "2" is displayed instead (step B3→B4).

In this case, since it is determined that no function key has been operated, the control passes to a step where the control waits for the next depression of numeral inputting keys or a function key (step TB→T20→T1).

When the "−" key is depressed in the correction process as shown in FIG. 26B[d], it is determined that the depression of the "−" key is the operation of a function key which is not accompanied by numeral keys. Thus, only function data of the displayed calculation data (for example, "234" "+") is changed to provide and display calculation data "234" "−". It is then determined that this calculation data is different from the calculation data input last time, and "1" is set in the correction non-coincidence register N (step B7→B8, B9→B10).

In this case, since it is determined that the function key has been depressed, the corrected and fixed calculation data "234" "−" is stored in the fixed value memory register 33c and "0" is set in the correction mode register H to thereby erase the message "CORRECT" (step TB→T20→T21, T22).

As shown in FIG. 26B[e], when the "MR" key is depressed, it is determined that the operation of the "MR" key is that of a function key accompanied by numerals. Thus, all the displayed calculation data (for example, "234" "+") is all erased and the memory data (in this case, "10") and the memory function data "MR" stored in the memory register MR are displayed instead (step B5→B6). It is then determined that this calculation data is different from that input last time, and "1" is set in the correction non-coincidence register N (step B9→B10).

In this case, it is determined that the function key has been depressed, so that the corrected and fixed calculation data "10" "MR" is stored in the fixed value memory register 33c and "0" is set in the correction mode register H to erase the message "CORRECT" (step TB→T20→T21, T22).

When the "M+" key is depressed in the correction process, as shown in FIG. 26B[f], it is determined that the depression of the "M+" key is the operation of a function key which is not accompanied by numerals. Thus, only function data of the displayed calculation data (for example, "234" "+") is changed to provide calculation data "234" "M+". It is then determined that this calculation data is different from the calculation data input last time, and "1" is set in the correction non-coincidence register N (step B7→B8, B9→B10).

In this case, since it is determined that the function key has been depressed, the corrected and fixed calculation data "234" "M+" is stored in the fixed value memory register 33c and "0" is set in the correction mode register H to thereby erase the message "CORRECT" (step TB→T20→T21, T22).

In this way, each time a function key is depressed, it is determined whether the calculation expression data input last time is coincident with the calculation expression data input this time. When it is determined that the calculation expression data input this time is not coincident with that input last time, the correcting and fixing process is performed. When the "=" key is then depressed, as shown in FIG. 26C[b], it is determined at step T1 that the answer is "NO", i.e., that the check mode register F is "1", and it is determined at step T8 that the answer is "NO", i.e., that the correction mode register H is "0", and it is determined that the numeral inputting keys have not been depressed, but that the "=" key has been depressed, in the check mode operation of the numeral inputting key/function key depression operation of FIGS. 20 and 21 (step T1→T8→T9→T11).

In response to the determination that the "=" key has been depressed, a calculation process is performed in accordance with the calculation expression input this time on the basis of the corrected fixed series of calculation data, and data on the result of the calculation is displayed. In addition, it is determined that the check operation has ended. It is then determined whether "0" has been set in the correction non-coincidence register N, that is, whether the correction process has been started due to non-coincidence of the calculation expression input this time with the calculation expression data input last time (step T11→T14, T15, T16→T26).

When it is determined that "0" has been set in the correction no-coincidence register N, that is, that the calculation expression data input last time and this time have no non-coincident data to be corrected, or that the same data as that input last time was corrected in the correction process, a message "OK" is displayed in the display 7 and "0" is set in the check mode register F to thereby erase the message "PROVING". Thus, the control returns to the normal mode process of the numeral inputting key/function key operation process of FIG. 20 (step T26→T27, T28, T1).

When "1" has been set in the correction non-coincidence register N, that is, when it is determined that the calculation data input last time and this time are non-coincident and corrected differently, no message "OK" is displayed, and "0" is set in the check mode register F to thereby erase the message "PROVING". Thus, the control returns to the normal mode process of the numeral inputting/function key operation process of FIG. 20 (step T26→T28, T1).

When it is determined that at step A5→A6 of the "▽" key operation of FIG. 22 that there is function data corresponding to the "MC" key at an address P0 of the journal memory 40, the memory register MR is cleared. This is because when calculation expression data is input after the check mode has been set, the memory register MR can be set with the same memory conditions as the initial conditions of the calculation expression input last time even when the depression of the "MC" key is forgotten.

As described above, when the head calculation data for the calculation expression stored last time at address P0 in the journal memory 40 is function data corresponding to "MC" key, and when depression of the "MC" key to input this time the head calculation data for the calculation expression has been forgotten and other calculation data has been input, calculation data at address P1 in the journal memory 40 is set as calculation data for the calculation expression and compared with the head calculation data for the calculation expression input this time, at step T12 of the check mode process of FIG. 21.

Finally, the procedures will be described next which are performed by the operation of the "AC" key when the respective calculation expressions are started to be input.

When the "AC" key of the key-in unit 5 is depressed, numerical data stored in the memory register MR of RAM 33 is transferred as a memory value at the beginning of the calculation to and stored in the initial memory register M, and all the data except for data in the memory register MR and the initial memory register M is cleared (steps D1, D2).

The value of the pointer register $P_n$ indicative of a relevant register of the journal memory 40 is reset at P0 (step D3).

When it is determined that "1" has been set in the check mode register F, that is, when data is being checked in the check mode or being corrected in the correction mode, the message "PROVING" displayed in the display 7a is erased and "0" is set in the check mode register F to thereby release the check mode (step D4→D5).

Thus, according to the computer as the second embodiment, for example, the calculation data "234" "+" input last time is compared to the calculation data "234" "−" input this time. When it is determined that both data are not coincident, the correction mode is set and the message "CORRECT" is displayed. When a correct "+" or "−" function key is depressed in the set correction mode, only the function data of the calculation data "234" "−" which was determined to be non-coincident is corrected, the resulting correct data is then displayed, the message "CORRECT" is erased, and the correction mode is released. Thus, all the calculation data which includes data on a set of numerals and functions is not necessarily required to be all erased or reinput, but only function data can be reinput for the purpose of correction.

According to the computer as the second embodiment, when, for example, the calculation data "123" "+" for the calculation expression input last time is compared with the calculation data "234" "+" for the calculation expression input this time and both data are determined to be non-coincident, the correction mode is set and the message "CORRECT" is displayed. When correct numerical data (for example, "234") is input in the set correction mode, incorrect numerical data of the calculation data "123" "+" which was determined to be non-coincident is replaced with input correct numerical data "234", and the resulting calculation data is displayed. When the "=" key is then depressed, the message "CORRECT" is erased and the correction mode is released. Thus, all the calculated data which includes data on a set of numerals and functions is not required to be erased or reinput, but only correct numerals can be reinput for the purpose of correction.

What is claimed is:

1. A device having a checking function, said device comprising:

detecting means for detecting unrelated data included in first inputted calculation data which is not related to a predetermined calculation to be performed on the first inputted calculation data;

memory control means, responsive to said detecting means detecting the unrelated data included in the first inputted calculation data, for controlling a memory so as not store the unrelated data;

check mode setting means for setting a check mode whereby second inputted calculation data is compared with the stored first inputted calculation data;

checking means for determining whether the second inputted calculation data is coincident with the stored first inputted calculation data; and an indicator for alerting a user when the checking means determines that the second inputted calculation data is not coincident with the stored first inputted calculation data.

2. The device according to claim 1, wherein said detecting means includes means for detecting correction data inputted to correct the first inputted calculation data, and said memory control means includes means for controlling the memory so as not the store the correction data.

3. The device according to claim 1, wherein said detecting means includes means for detecting sign switching data inputted by an even number of operations of a sign switching key, and memory control means includes means for controlling the memory so as not to store the sign switching data.

4. The proving device according to claim 1, wherein said memory control means includes means for controlling the memory to store only a last one of successively inputted function data, each of said function data specifying an arithmetic operation.

5. A device having a checking function, said device comprising:

memory control means for controlling a memory to sequentially store successive pairs of numerical data and subsequent function data of first inputted calculation data, each of said function data of said first inputted calculation data specifying an arithmetic operation;

check mode setting means for setting a check mode whereby successive pairs of numerical data and subsequent function data of second inputted calculation data are compared with corresponding successive pairs of numerical data and subsequent function data of the stored first inputted calculation data, each of said function data of said second inputted calculation data also specifying an arithmetic operation;

checking means, responsive to each input of a pair of numerical data and subsequent function data of the second inputted calculation data, for determining whether the inputted pair of numerical data and subsequent function data of the second inputted calculation data are coincident with the corresponding pair of numerical data and subsequent function data of the stored first inputted calculation data;

correction mode setting means for setting a correction mode when said checking means determines that the pair of numerical data and subsequent function data of the second inputted calculation data are not coincident with the corresponding pair of numerical data and subsequent function data of the stored first inputted calculation data;

display control means, responsive to said correction mode being set, for controlling a display to display at least one of the non-coincident pair of numerical data and subsequent function data of the stored first inputted calculation data and the non-coincident pair of numerical data and subsequent function data of the second inputted calculation data;

function data switching means for: (i) replacing the function data of at least one of the at least one displayed noncoincident pair of numerical data and subsequent function data when only new function data is inputted, (ii) causing the display to display the replaced new function data instead of the previously displayed function data, and (iii) rewriting the function data of the non-coincident pair of numerical data and subsequent function data of the stored first inputted calculation data with the new function data when the function data of the non-coincident pair of numerical data and subsequent function data of the stored first inputted calculation data has been replaced.

6. The device according to claim 5, further comprising correction mode releasing means for releasing the correction mode after each time said function data switching means replaces the function data of the non-coincident pair of numerical data and subsequent function data of the stored first inputted calculation data.

* * * * *